United States Patent
LeClerc et al.

(10) Patent No.: US 9,145,038 B2
(45) Date of Patent: Sep. 29, 2015

(54) VEHICLE SUSPENSION AND PNEUMATIC SYSTEMS

(75) Inventors: Daniel LeClerc, St-Denis-de-Brompton (CA); Marc Gagnon, Austin (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 572 days.

(21) Appl. No.: 13/222,747

(22) Filed: Aug. 31, 2011

(65) Prior Publication Data

US 2013/0054091 A1 Feb. 28, 2013

(51) Int. Cl.
*B60G 17/015* (2006.01)
*B60G 17/016* (2006.01)
*B60G 17/017* (2006.01)
*G06F 19/00* (2011.01)
*B60G 17/04* (2006.01)
*B60G 11/27* (2006.01)

(52) U.S. Cl.
CPC ............... *B60G 17/04* (2013.01); *B60G 11/27* (2013.01); *B60G 2300/124* (2013.01); *B60G 2300/13* (2013.01); *B60G 2400/51222* (2013.01); *B60G 2500/201* (2013.01)

(58) Field of Classification Search
CPC .................. B60G 2202/152; B60G 2400/252; B60G 2500/30; B60G 11/27
USPC .......................................................... 701/37
See application file for complete search history.

(56) References Cited

U.S. PATENT DOCUMENTS

| | | | |
|---|---|---|---|
| 4,468,739 A * | 8/1984 | Woods et al. | 701/37 |
| 4,693,494 A * | 9/1987 | Buma et al. | 280/5.516 |
| 5,540,268 A | 7/1996 | Mittal | |
| 6,799,781 B2 | 10/2004 | Rasidescu et al. | |
| 6,892,842 B2 | 5/2005 | Bouffard et al. | |
| 7,032,895 B2 | 4/2006 | Folchert | |
| 7,611,154 B2 | 11/2009 | Delaney | |
| 7,637,338 B2 | 12/2009 | Maltais et al. | |
| 2003/0217884 A1 | 11/2003 | Kawamoto | |
| 2008/0122195 A1* | 5/2008 | Beeson et al. | 280/151 |

FOREIGN PATENT DOCUMENTS

WO 2010138867 A1 12/2010

OTHER PUBLICATIONS

International Search Report of PCT/US2010/036658; Jul. 28, 2010; Blaine R. Copenheaver.

* cited by examiner

*Primary Examiner* — John Q Nguyen
*Assistant Examiner* — Kyung Kim
(74) *Attorney, Agent, or Firm* — BCF LLP

(57) ABSTRACT

A vehicle has a frame, at least two wheels, at least one front and one rear suspension assembly, at least one of the suspension assemblies including an air spring, an air compressor, at least one air spring valve selectively fluidly communicating the air compressor with the at least one air spring, an auxiliary air output, an auxiliary valve selectively fluidly communicating the auxiliary air output with the air compressor, a control unit electrically connected to the air compressor, the at least one air spring valve, the auxiliary valve, and a vehicle condition sensor. The condition sensor senses an operating condition of the vehicle. The control unit only opens the auxiliary valve to fluidly communicate the auxiliary air output with the air compressor when a predetermined operating condition of the vehicle is sensed by the condition sensor. A method of controlling a pneumatic system of a vehicle is also disclosed.

26 Claims, 17 Drawing Sheets

VEHICLE SUSPENSION AND PNEUMATIC SYSTEMS

TECHNICAL FIELD

The present invention relates to a suspension system and a pneumatic system for a vehicle.

BACKGROUND

In many all-terrain vehicles (ATVs), such as straddle-type ATVs and side-by-side recreational utility vehicles (RUVs), as well as in other types of vehicles, the vehicle suspension system often includes a sway bar, also known as an anti-roll bar. The sway bar is used to connect laterally opposite wheels. The sway bar helps reduce the tendency of the vehicle to roll such as when the vehicle is turning. However, sway bars add weight and mechanical complexity to the vehicle.

Some vehicles also use air springs in their suspension system. In such vehicles, a compressor or pressurized gas reservoir is used to supply pressurized air or gas to the air springs. However, in systems using a compressor, dust, dirt, and/or water can often enter the compressor along with the air. These can cause a malfunction of the compressor and or the air springs over time. This problem is exacerbated when the vehicle is used in off-road conditions, such as for all-terrain vehicles.

Finally, many users of off-road vehicles bring an air compressor with them when using their vehicle. The air compressor can be used to inflate a flat tire for example, which would otherwise be very difficult due to the remoteness of the locations where off-road vehicles are used. The air compressor can also be used to inflate other things such as an inflatable boat. However, in many off-road vehicles, such as all-terrain vehicles, the amount of storage space on the vehicle is limited. As air compressors can be bulky, storing one on the vehicle takes up a significant amount of the limited storage space.

SUMMARY

It is an object of the present to ameliorate at least some of the inconveniences present in the prior art.

An aspect of a present provides a vehicle having a frame, at least one front wheel connected to the frame, at least one front suspension assembly connecting the at least one front wheel to the frame, at least one rear wheel connected to the frame, at least one rear suspension assembly connecting the at least one rear wheel to the frame, at least one of the at least one front and at least one rear suspension assemblies including an air spring, a seat connected to the frame, a steering device operatively connected to the at least one front wheel, an engine connected to the frame and operatively connected to at least one of the wheels, an air compressor connected to the frame, at least one air spring valve selectively fluidly communicating the air compressor with the at least one air spring for supplying air to the at least one air spring, an auxiliary air output supported by the frame, an auxiliary valve selectively fluidly communicating the auxiliary air output with the air compressor for selectively supplying air from the air compressor to a device other than the at least one air spring, a control unit electrically connected to the air compressor for controlling an operation of the air compressor and electrically connected to the at least one air spring valve and the auxiliary valve for controlling positions of the valves, a vehicle condition sensor electrically connected to the control unit. The vehicle condition sensor senses an operating condition of the vehicle. The control unit only opens the auxiliary valve to fluidly communicate the auxiliary air output with the air compressor when a predetermined operating condition of the vehicle is sensed by the vehicle condition sensor.

In an additional aspect, the vehicle condition sensor is a vehicle speed sensor sensing a speed of the vehicle. The predetermined operating condition of the vehicle is the speed of the vehicle being one of less than or equal to a predetermined vehicle speed.

In a further aspect, the predetermined operating condition of the vehicle is the speed of the vehicle being equal to 0 km/h.

In an additional aspect, the vehicle condition sensor is a parking brake sensor sensing a position of a parking brake of the vehicle. The predetermined operating condition of the vehicle is the parking brake being engaged.

In a further aspect, the vehicle condition sensor is a shifter position sensor sensing a position of a shifter of the vehicle. The predetermined operating condition of the vehicle is the shifter being in one of a neutral shift position and a park shift position.

In an additional aspect, an air passage fluidly communicates the air compressor with the at least one air spring valve and the auxiliary valve, an auxiliary air output hose fluidly communicates the auxiliary valve with the auxiliary air output, and a pressure sensor fluidly communicates with the air passage for sensing an air pressure inside the air passage. The pressure sensor is electrically connected to the control unit for sending a signal representative of the air pressure inside the air passage to the control unit. The control unit opens the at least one air spring valve to fluidly communicate the at least one air spring with the air passage such that the pressure sensor senses an air pressure in the at least one air spring. The control unit maintains the at least one air spring valve opened and sends a signal to the air compressor to supply air when the air pressure in the at least one air spring sensed by the air pressure sensor is less than a first predetermined air pressure. When the predetermined operating condition of the vehicle is sensed by the vehicle condition sensor, the control unit opens the auxiliary valve to fluidly communicate the auxiliary air output hose with the air passage such that the pressure sensor senses an air pressure in the auxiliary air output hose. The control unit maintains the auxiliary valve opened and sends a signal to the air compressor to supply air when the air pressure in the auxiliary air output line sensed by the air pressure sensor is less than a second predetermined air pressure. The control unit only opens one of the at least one air spring valve and the auxiliary valve at a time.

In a further aspect, an exhaust valve selectively fluidly communicates the air passage with an atmosphere. The control unit is electrically connected to the exhaust valve for controlling positions of the exhaust valve. The control unit maintains the first valve opened and opens the exhaust valve when the air pressure in the air spring sensed by the air pressure sensor is greater than the first predetermined air pressure.

In an additional aspect, the at least one front wheel is two front wheels, the at least one front suspension assembly is two front suspension assemblies, the steering device is operatively connected to the two front wheel, the at least one rear wheel is two rear wheels, the at least one rear suspension assembly is two rear suspension assemblies, the at least one air spring is a first air spring, a second air spring, a third air spring, and a fourth air spring, the first air spring is included in one of the two front suspension assemblies, the second air spring is included in another one of the two front suspension assemblies, the third air spring is included in one of the two rear suspension assemblies, and the fourth air spring is included in another one of the two rear suspension assemblies.

In a further aspect, the at least one air spring valve is a first air spring valve, a second air spring valve, and at least one third air spring valve, the first air spring valve selectively fluidly communicates the air passage with the first air spring, the second air spring valve selectively fluidly communicates the air passage with the second air spring, and the at least one third air spring valve selectively fluidly communicates the air passage with the third and fourth air springs.

In an additional aspect, when the predetermined operating condition of the vehicle is not sensed by the vehicle condition sensor, the control unit successively opens the first air spring valve, the second air spring valve and the at least one third air spring. When the predetermined operating condition of the vehicle is sensed by the vehicle condition sensor, the control unit successively opens the first air spring valve, the auxiliary valve, the second air spring valve, the auxiliary valve, the at least one third air spring, and the auxiliary valve. The control unit only opens one of the first, second and at least one third air spring valves and the auxiliary valve at a time.

In a further aspect, at least one accumulator chamber fluidly communicates the at least one air spring valve with the at least one air spring.

In another aspect, the present provides a method of controlling a pneumatic system of a vehicle. the pneumatic system including an air compressor, at least one air spring associated with at least one suspension assembly of the vehicle, and an auxiliary output for supplying air from the air compressor to a device other than the at least one air spring. The method comprises: sensing an air pressure in the at least one air spring; supplying air from the air compressor to the at least one air spring when the air pressure in the at least one air spring is less than a first predetermined pressure; determining if the vehicle is stationary; and only when the vehicle is determined to be stationary: sensing an air pressure in an auxiliary air output hose fluidly communicating with the auxiliary air output; and supplying air from the air compressor to the auxiliary air output hose when the air pressure in the auxiliary air output hose is less than a second predetermined pressure.

In an additional aspect, determining if the vehicle is stationary includes sensing a speed of the vehicle.

In a further aspect, determining if the vehicle is stationary includes determining if a parking brake of the vehicle is engaged.

In an additional aspect, determining if the vehicle is stationary includes determining if a shifter of the vehicle is in one of a neutral shift position and a park shift position.

In a further aspect, the method further comprises fluidly communicating the at least one air spring with an atmosphere when the air pressure in the at least one air spring is greater than a first predetermined pressure.

In an additional aspect, the method further comprises using a common air pressure sensor to sense the air pressure in the at least one air spring and the air pressure in the auxiliary air output hose.

In a further aspect, the pneumatic system also includes at least one air spring valve selectively fluidly communicating the at least one air spring with the air compressor, an auxiliary valve selectively fluidly communicating the auxiliary air output hose with the air compressor, and an air passage fluidly communicating the air compressor with the at least one air spring valve and the auxiliary valve. Using the common air pressure sensor includes sensing air pressure in the air passage; sensing the air pressure in the at least one air spring includes opening the at least one air spring valve; sensing the air pressure in the auxiliary air output hose includes opening the at least one auxiliary valve; and only one of the at least one air spring valve and the auxiliary valve is opened at a time.

In an additional aspect, the at least one air spring is a first air spring, a second air spring, a third air spring, and a fourth air spring, and the at least one air spring valve is a first air spring valve, a second air spring valve, and at least one third air spring valve. Opening the at least one air spring valve includes: opening the first air spring valve to fluidly communicate the air passage with the first air spring; opening the second air spring valve to fluidly communicate the air passage with the second air spring; and opening the at least one third air spring valve to fluidly communicate the air passage with the third and fourth air springs.

In a further aspect, the method further comprises: successively opening the first air spring valve, the second air spring valve and the at least one third air spring when the vehicle is determined to be in movement; and successively opening the first air spring valve, the auxiliary valve, the second air spring valve, the auxiliary valve, the at least one third air spring, and the auxiliary valve when the vehicle is determined to be stationary. Only one of the first, second and at least one third air spring valves and the auxiliary valve is opened at a time.

In an additional aspect, when the vehicle is determined to be in movement, supplying air from the air compressor to the at least one air spring when the air pressure in the at least one air spring is less than the first predetermined pressure includes: estimating an amount of time during which the air compressor needs to supply air to increase the air pressure in the at least one air spring to the first predetermined pressure; and supplying air from the air compressor for the amount of time. When the vehicle is determined to be stationary, supplying air from the air compressor to the at least one air spring when the air pressure in the at least one air spring is less than the first predetermined pressure includes: supplying air from the air compressor until the sensed air pressure in the at least one air spring corresponds to the first predetermined pressure.

In a further aspect, supplying air from the air compressor to the at least one air spring includes supplying air from the air compressor to the at least one air spring via at least one accumulator chamber.

For purposes of this application terms related to spatial orientation such as forwardly, rearwardly, left, and right, are as they would normally be understood by a driver of the vehicle sitting thereon in a normal driving position.

Example embodiments of the present vehicle have at least one of the above-mentioned aspects, but do not necessarily have all of them. It should be understood that example embodiments of the present vehicle may have other aspects not specifically recited herein.

Additional and/or alternative features, aspects, and advantages of embodiments of the present vehicle will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present will be described with reference to a side-by-side recreational utility vehicle (RUV) 10. However, it is contemplated that aspects of the RUV 10 could be used in other types of vehicles, such as a straddle-type all-terrain vehicle (ATV) having four wheels, and/or in vehicles having less or more than four wheels. An example of a straddle-type ATV is described in International Patent Publication No. WO 2010/138867 A1, published Dec. 2, 2010, the entirety of which is incorporated herein by reference.

Figure 1:
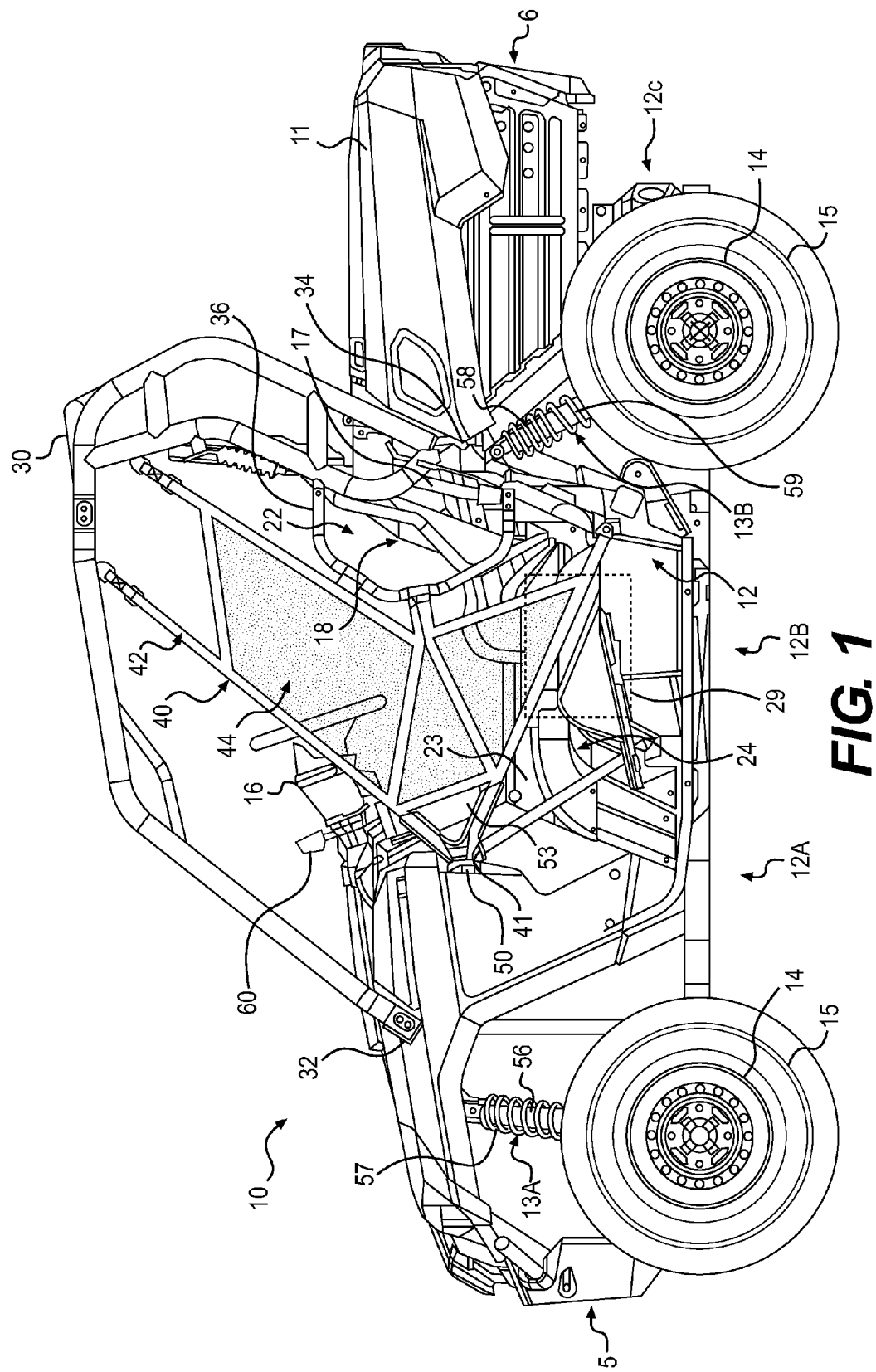
FIG. 1 is a left side elevation view of recreational utility vehicle (RUV), with fairings partially removed for clarity.
Figure 2:
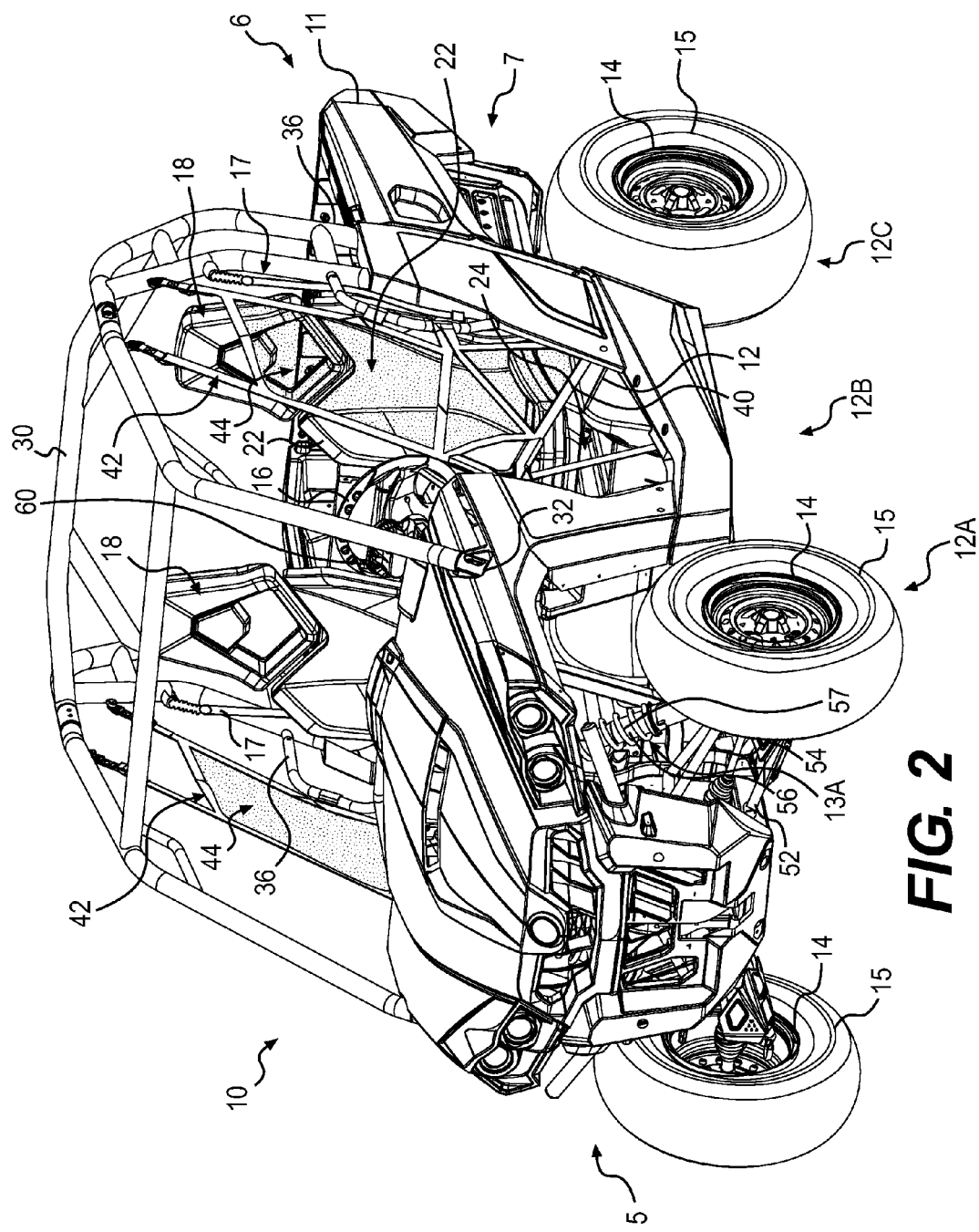
FIG. 2 is a perspective view taken from a front, left side of the RUV of FIG. 1.
Figure 3:
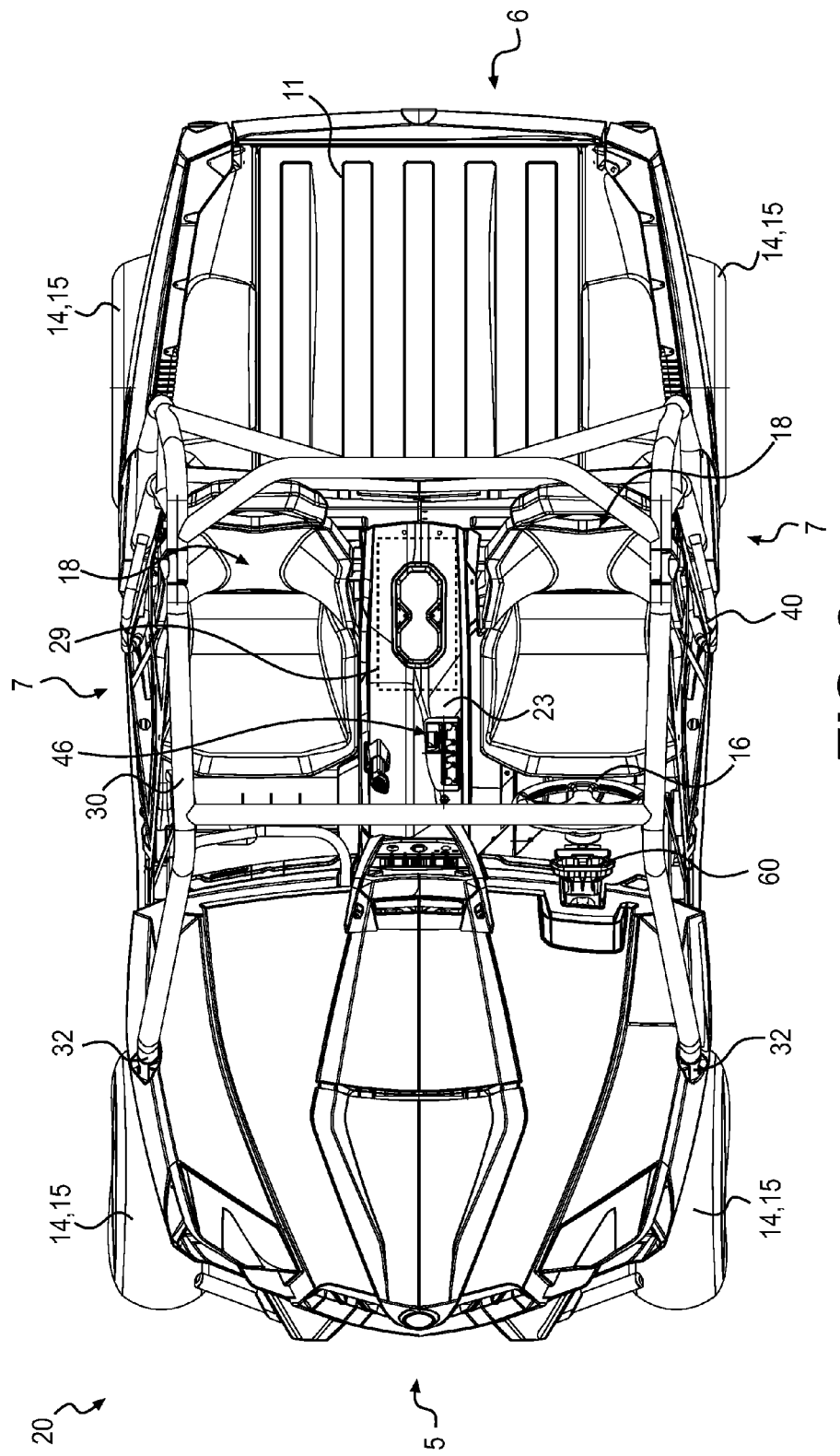
FIG. 3 is a top plan view of the RUV of FIG. 1.

FIGS. 1 to 3 illustrate the RUV 10. The RUV 10 has a front end 5 a rear end 6, and two lateral sides 7 (left and right). The RUV 10 includes a frame 12 to which a vehicle body is mounted. The frame 12 has a front portion 12A, a middle portion 12B and a rear portion 12C. A pair of front wheels 14 is suspended from the front portion 12A of the frame 12 via front suspension assemblies 13A. A pair of rear wheels 14 is suspended from the rear portion 12C of the frame 12 via rear suspension assemblies 13B. The front and rear suspension assemblies 13A, 13B will be described in greater detail below. Each of the four wheels 14 has a tire 15. A cockpit area 22 is disposed in the middle portion 12B of the frame 12. The cockpit area 22 comprises two seats 18 (left and right). Each seat 18 is a bucket seat having a seat base and a backrest. It is contemplated that the seats 18 could be other types of recumbent seats. Each seat is also provided with a seat belt 17. The left and right seats 18 are mounted laterally beside each other to accommodate a driver and a passenger (riders), respectively, of the RUV 10.

A roll cage 30 is connected to the frame 12 and is disposed above the cockpit area 22. The roll cage 30 is an arrangement of metal tubes that contributes to protecting the riders in the event the vehicle rolls over. The roll cage 30 has several attachment points to the frame 12. Toward the front 5 of the RUV 10, the roll cage 30 connects to the frame 12 at front attachment points 32 (left and right). The front attachment points 32 are located longitudinally between a roll axis of the front wheels 14 and a foremost point of the seats 18. Toward the rear 6 of the RUV 10, the roll cage 30 connects to the frame 12 at rear attachment points 34 (left and right). The rear attachment points 34 are located longitudinally between a roll axis of the rear wheels 14 and the rearmost point of the seat base of the seats 18. The roll cage 30 further includes a pair of lateral restraining members 36, one on each side of a rear part of the roll cage 30. The lateral restraining members 36 extend forward from the rear part of the roll cage 30 partially into the lateral passages 24. The lateral restraining members 36 are U-shaped tubes which protect an upper body of the riders during leaning or rollover. It is contemplated that the lateral restraining members 36 could have a different shape. It is also contemplated that the restraining members 36 could be omitted.

The cockpit area 22 is open at the two lateral sides 7 of the RUV 10, forming two lateral passages 24 (left and right), through which the riders can ingress and egress the RUV 10. A lateral cover 40 is selectively disposed across each lateral passages 24. The lateral cover 40 extends vertically from the roll cage 30 to a point vertically lower than the seat base 17. It is contemplated that only one of the two lateral passages 24 could be selectively partially covered by a lateral cover 40. The lateral covers 40 are made of flexible straps 42 and flexible panels 44 of meshed material. As it will be explain below, when the riders are riding the RUV 10, the lateral cover 40 is intended to be disposed across the lateral passage 24. However, when the riders are not riding the RUV 10 and they desire either ingress or egress the cockpit area 22, the lateral cover 40 can be opened to clear the lateral passage 24.

A cargo box 11 is pivotally mounted to the frame 12 rearwardly of the seats 18. It is contemplated that the cargo box 11 could be omitted.

A steering device 16 including a steering wheel is disposed in front of the left seat 18. It is contemplated that, the steering wheel could be disposed in front of the right seat 18. The steering device 16 is operatively connected to the two front wheels 14 to permit steering of the RUV 10.

Figure 4:
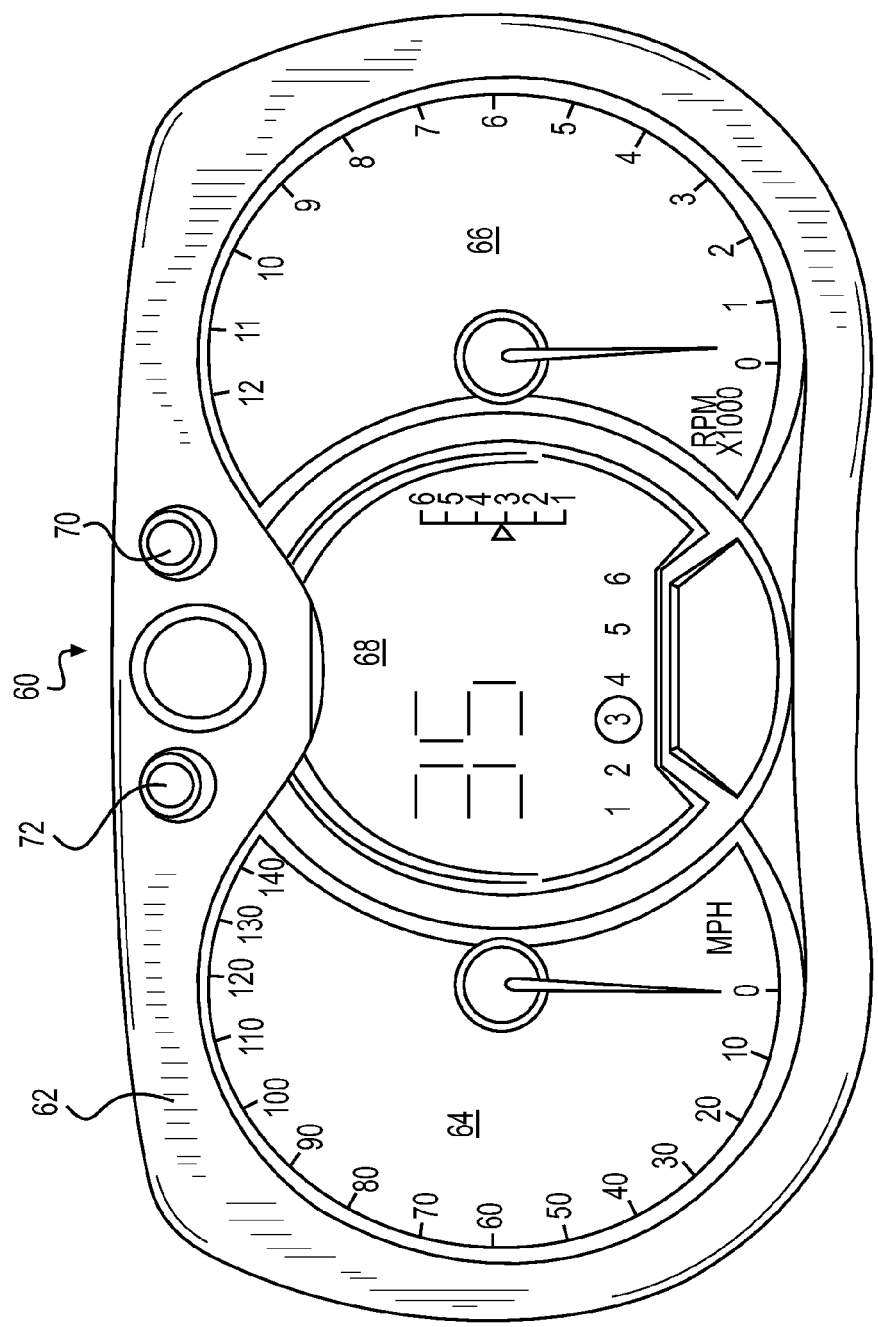
FIG. 4 illustrates a display cluster of the RUV of FIG. 1.

A display cluster 60 is disposed forwardly of the steering wheel of the steering device 16. It is contemplated that the display cluster 60 could be disposed elsewhere in the cockpit area 22. As seen in FIG. 4, the display cluster 60 has a frame 62 inside which three gauges 64, 66, and 68 are provided. It is contemplated that the gauges 64, 66, and 68 could be separate from each other. The gauge 64 displays the speed of the RUV 10. The gauge 66 displays the speed of rotation of an engine 29 of the RUV 10. The gauge 68 is a digital gauge that can display various information regarding the RUV 10, such as oil level, engine temperature, and also information relating to the suspension system and pneumatic system of the RUV 10 as described in greater detail below. The display cluster 60 also has a mode button 70 and a set button 72. The mode button 70 is used to select which information is displayed on the gauge 68. The set button 72 is used to modify the information displayed and/or to provide inputs related to the information displayed on the gauge 68 to an electronic control unit (ECU) 100 (FIG. 10) of the RUV 10 as described in greater detail below. It is contemplated that additional buttons could be provided on the display cluster 60, on the steering wheel and/or in the cockpit area 22 to control additional features of the display cluster 60 and/or to provide additional inputs to ECU 100.

An engine 29, schematically shown in FIGS. 1 and 3, is mounted to the middle portion 12B of frame 12 and has a portion disposed between the right and the left seats 18. The engine 29 is operatively connected to the four wheels 14 to power the RUV 10. It is contemplated that the engine 29 could be operatively connected only to the front wheels 14 or only to the rear wheels 14 or could selectively switch between driving two and four wheels 14. A console 23 positioned between the right and left seats 18 covers and separates the engine 29 from the driver and the passenger. The console 23 defines in part a central cooling tunnel allowing air to flow from the front end 5 of the vehicle 10 to the rear end 6 of the vehicle to cool the engine 29. International Patent Publication Number WO 2009/096977 A1, published Aug. 6, 2009, the entirety of which is incorporated herein by reference, describes a cooling tunnel for an RUV similar to the one defined by the console 23 for the RUV 10. The engine 29 is a four-stroke V-twin engine. Accordingly, the engine 29 has two cylinders extending at an angle from each other. It is contemplated that other types of engines could be used. For example, the engine 29 could be a two-stroke engine with in-line cylinders. A transmission (not shown) is operatively connected between the engine 29 and the wheels 14. A shifter 46 located on the console 23 enables a driver to select one of a plurality of drive modes provided by the transmission. The drive modes include park, neutral, reverse, low, and drive. It is contemplated that the transmission could have other drive modes.

Fuel to be supplied to the engine 29 is stored in a fuel tank (not shown) disposed under the passenger seat 18. The fuel tank is mounted to the middle portion 12B of the frame 12. Air is supplied to the engine 29 via air induction system. The air induction system includes an intake manifold (not shown) connected to both cylinders of the engine 29, a first intake conduit (not shown) connected upstream of the intake manifold, a throttle body (not shown) connected upstream of the intake conduit, a second intake conduit (not shown) connected upstream of the throttle body, and an air box 74 (FIG. 5) connected upstream of the second intake. When the engine 29 is operating, air flows consecutively through the air box 74, the second intake conduit, the throttle body, the first intake conduit, the intake manifold and then enter the air intake ports of the cylinders of the engine 29. The air box 74 has an air filter 76 (shown in phantom in FIG. 5) therein between an inlet and outlet thereof to prevent dust and other particles from entering the engine 29. An exhaust system (not shown) delivers exhaust gases from the engine 29 to the atmosphere.

Figure 5:
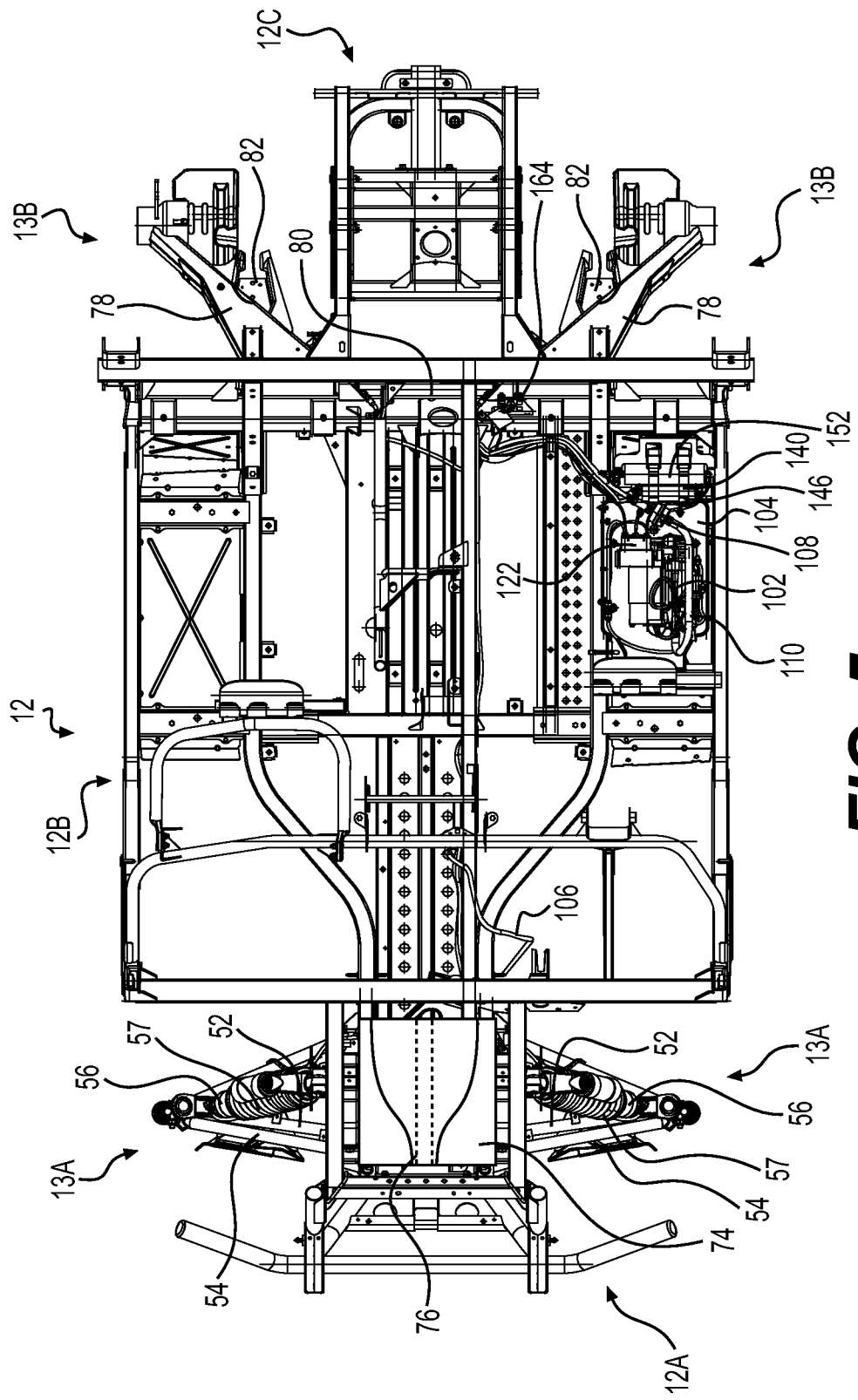
FIG. 5 is a top plan view of portions of a frame of the RUV of FIG. 1, with a pneumatic system and portions of suspension assemblies mounted of to it.
Figure 6:
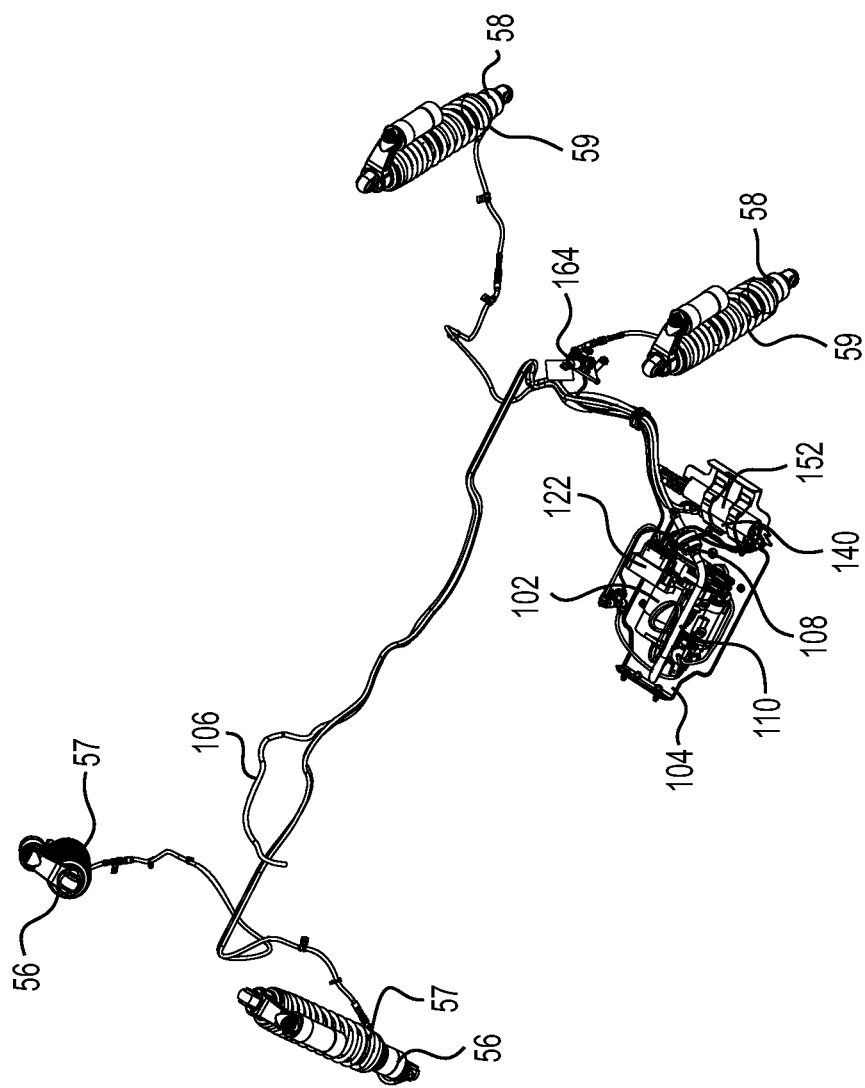
FIG. 6 is a perspective view taken from a rear, left side, of the pneumatic system of the RUV of FIG. 1.

With reference to FIGS. 1, 2 and 5, the front and rear suspension assemblies 13A, 13B will now be described. The left suspension assemblies 13A, 13B being identical to the right suspension assemblies 13A, 13B, only the left suspension assemblies 13A, 13B will be described below. Accordingly, identical elements are labeled with the same reference numerals in the figures. It is contemplated that at least some of the elements of the right suspension assemblies 13A, 13B may be different from their corresponding elements of the left suspension assemblies 13A, 13B. For example, suspension elements on one side may differ from suspension elements on the other side to accommodate elements of the vehicle 10 that are present on only one side or that differ between each side.

The front left suspension assembly 13A includes lower and upper A-arms 52, 54. The lower A-arm 52 is pivotally connected at one end to the front portion 12A of the frame 12 and is pivotally connected to a lower portion of a kingpin (not shown) at the other end. The front left wheel 14 is rotationally connected to the kingpin. The upper A-arm 54 is disposed above the lower A-arm 52. The upper A-arm 54 is pivotally connected at one end to the front portion 12A of the frame 12 and pivotally connected to an upper portion of the kingpin at the other end. An air spring 56 is connected between the outer end of the upper A-arm 54 and the front portion 12A of the frame 12. A coil spring 57 is deposed around the air spring 56. The air spring 56 provides a variable spring rate that increases as the air spring 56 is compressed. The range of the spring rates provided by the air spring 56 depends on the pressure of the air initially supplied to it. It is contemplated that the air pressure initially supplied to the air spring 56 could vary between 0 psi and 85 psi, but higher pressures are contemplated. It is contemplated that the air spring 56 could be a Float R sport shock manufactured by Fox Factory Inc. Other types of air springs are also contemplated. In one embodiment, the coil spring 57 is selected to provide a spring rate that has a value between 7 N/mm and 21 N/mm. In another embodiment, the coil spring 57 is selected to provide a spring rate that has a value between 9 N/mm and 19 N/mm inclusively. It is contemplated that the spring rate of the coil spring 57 could be outside of the ranges specified above.

The rear left suspension assembly 13B includes a swing arm 78 and an air spring 58 disposed inside of a coil spring 59. The air spring 58 and the coil spring 59 are the same as the air spring 56 and the coil spring 59 described above, however it is contemplated that they could be different. A tubular front end of the swing arm 78 is inserted over a shaft 80 defining a pivot axis of the swing arm 78. From its front end, the swing arm 78 extends outwardly and rearwardly to its tubular rear end inside which the spindle (not shown) of the rear left wheel 14 is received. The swing arm 78 has a plate 82 integrally formed therewith that extends rearwardly from a central portion of the swing arm 78. A lower end of the air spring 58 is connected to the plate 82. From the plate 82, the air spring 58 extends upwardly and forwardly to connect to the frame 12.

It is contemplated that for some aspects of the present, coil over shock assemblies could replace the air springs 56 disposed inside the coil springs 57 or the air springs 58 disposed inside the coil springs 59 such that only the front or the rear suspension assemblies 13A, 13B would be provided with air springs 56 or 58. It is also contemplated that other types of suspension assemblies using air springs disposed inside of coil springs could be used. For example, it is contemplated that the rear suspension assemblies 13B could have upper and lower A-arms similar to the front suspension assemblies 13A instead of the swing arms 78.

Turning now to FIGS. 5 to 10, a pneumatic system of the RUV 10 and portions of the electrical system of the RUV 10 associated with the pneumatic system will be described.

The pneumatic system includes an air compressor 102 mounted via a bracket 104 to the middle portion 12B of the frame 12 under the driver seat 18. The air compressor 102 is powered by the electrical system of the RUV 10 (i.e. the battery or magneto, not shown). It is contemplated that the compressor 102 could be a mechanical compressor driven by the engine 29. Air to be supplied to the compressor 102 flows from an inlet of the air box 74, through the air filter 76, through a hose 106 connected to the air box 74, through another air filter 108, and finally through a hose 110 connected to the air compressor 102. Since the air box 74 is disposed higher than the wheels 14, the likelihood of water entering the air compressor 102 is reduced. It is contemplated that one of the filters 76 and 108 could be omitted. It is contemplated that the inlet of the hose 106 could be connected at other points along the air intake system of the engine 29 instead of being connected to the air box 74.

The air compressor 102 includes a valve 112 located upstream of its outlet which opens to permit or prevent flow of air from the air compressor 102 or back through the air compressor 102 as described below. The outlet of the air compressor 102 is connected to a hose 114. The hose 114 is connected to a T-connector 116. One end of the T-connector 116 is connected to a check valve 118. The check valve 118 is connected to a hose 120 that is connected to an air manifold 122. As such, the check valve 118 prevents air from flowing from the manifold 122 back towards the air compressor 102 via the hose 120. As such, when in operation, the air compressor 102 supplies air to the manifold 122 via the hose 114, the T-connector 116, the check valve 118 and the hose 120.

Figure 10:
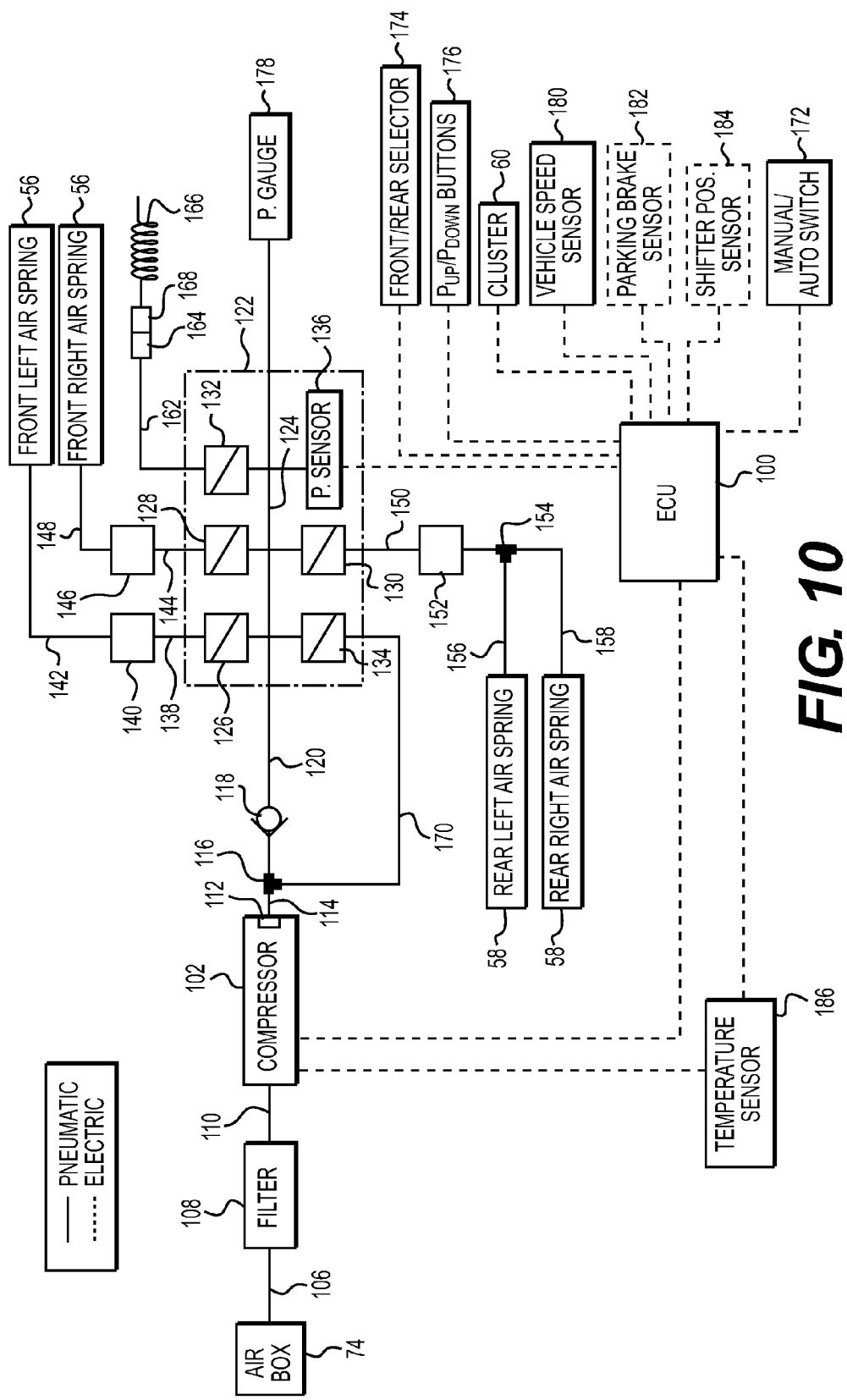
FIG. 10 is a schematic illustration of a pneumatic system and portions of an electric system of the RUV of FIG. 1.

As can be seen in FIG. 10, the manifold 122 has an air passage 124 that splits the flow of air from the hose 122. The manifold 122 contains three air spring valves 126, 128, 130, an auxiliary valve 132, an exhaust valve 134, and an air pressure sensor 136, all of which are connected to the air passage 124. The three air spring valves 126, 128, 130, the auxiliary valve 132, the exhaust valve 134, and the air pressure sensor 136 are electrically connected to the ECU 100. The three air spring valves 126, 128, 130, the auxiliary valve 132, the exhaust valve 134 are electrically actuated valves that, as will be described in greater detail below, are opened and closed in response to signals from the ECU 100.

The air spring valve 126 is connected to a hose 138 that is connected to an accumulator chamber 140. The accumulator chamber 140 is connected to a hose 142 that is connected to the front left air spring 56. As will be described in greater detail below, to supply air to the front left air spring 56 in order to increase the air pressure inside the front left air spring 56, the air spring valve 126 is opened and the air compressor 102 is turned on.

Similarly, the air spring valve 128 is connected to a hose 144 that is connected to an accumulator chamber 146. The accumulator chamber 146 is connected to a hose 148 that is connected to the front right air spring 56. As will be described in greater detail below, to supply air to the front right air spring 56 in order to increase the air pressure inside the front right air spring 56, the air spring valve 128 is opened and the air compressor 102 is turned on.

The air spring valve 130 is connected to a hose 150 that is connected to an accumulator chamber 152. The accumulator chamber 152 is connected to a T-connector 154. One end of the T-connector 154 is connected to a hose 156 that is connected to the rear left air spring 58. The other end of the T-connector 154 is connected to a hose 158 that is connected to the rear right air spring 58. As will be described in greater detail below, to supply air to the rear air springs 58 in order to increase the air pressure inside the rear air springs 58, the air spring valve 130 is opened and the air compressor 102 is turned on. In this embodiment, both rear air springs 58 operate at the same air pressure. It is contemplated that each one of the rear air springs 58 could be provided with its own air spring valve and accumulator chamber as is the case for the front air springs 56.

Figure 7:
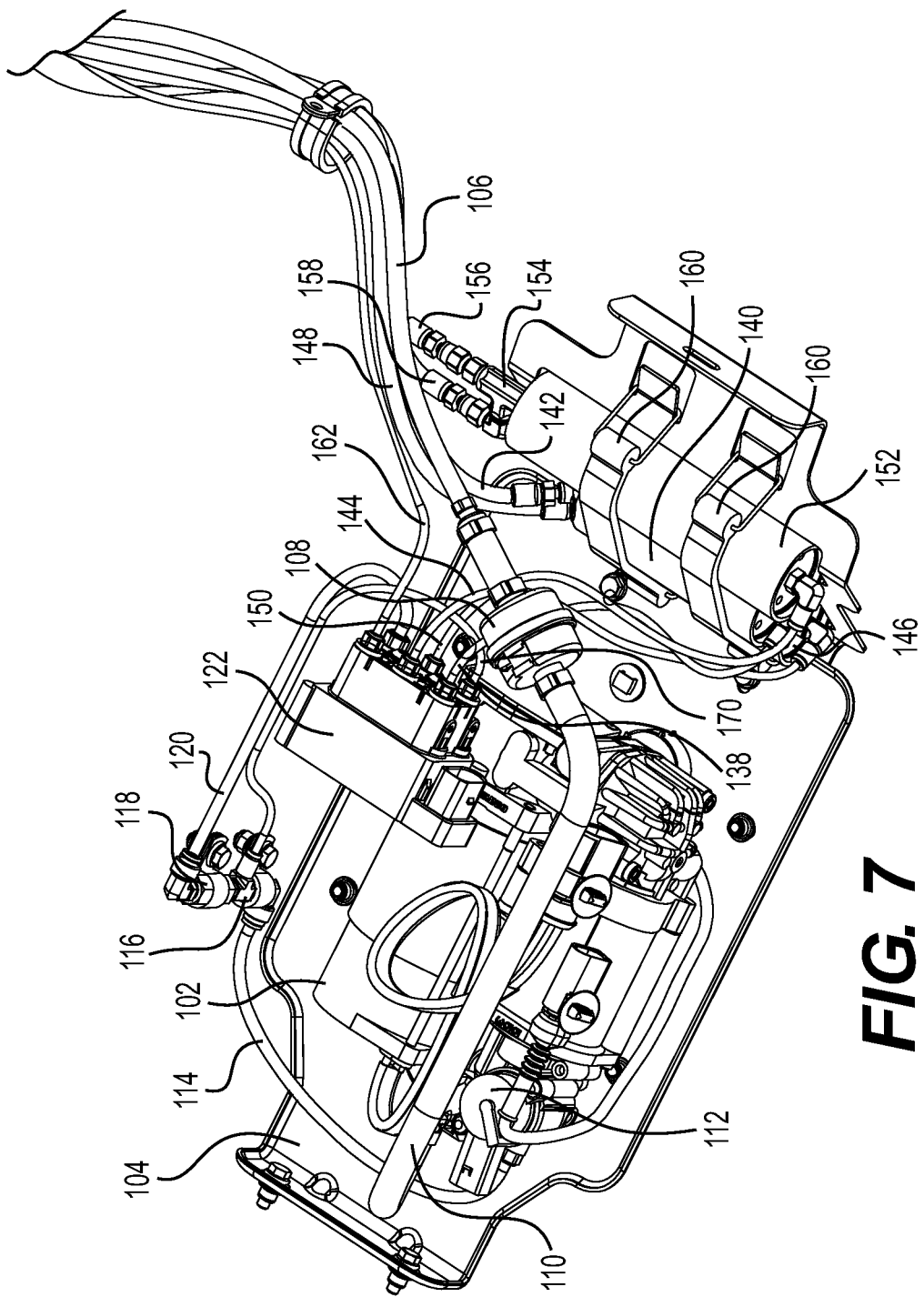
FIG. 7 is a perspective view taken from a rear, left side of a compressor and associated components of the pneumatic system of FIG. 6.
Figure 8:
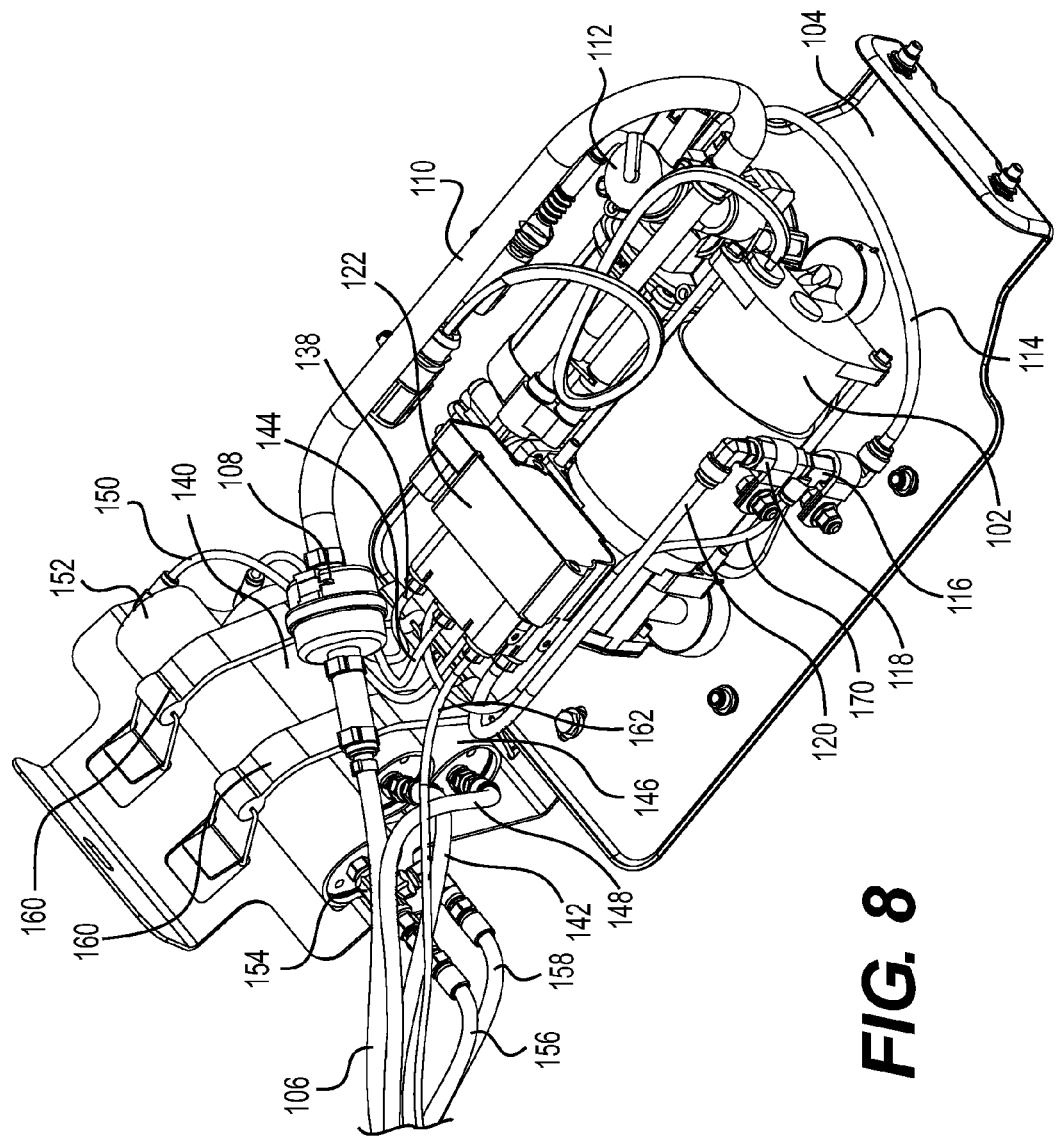
FIG. 8 is a perspective view taken from a front, right side of the compressor and associated components of FIG. 7.
Figure 9:
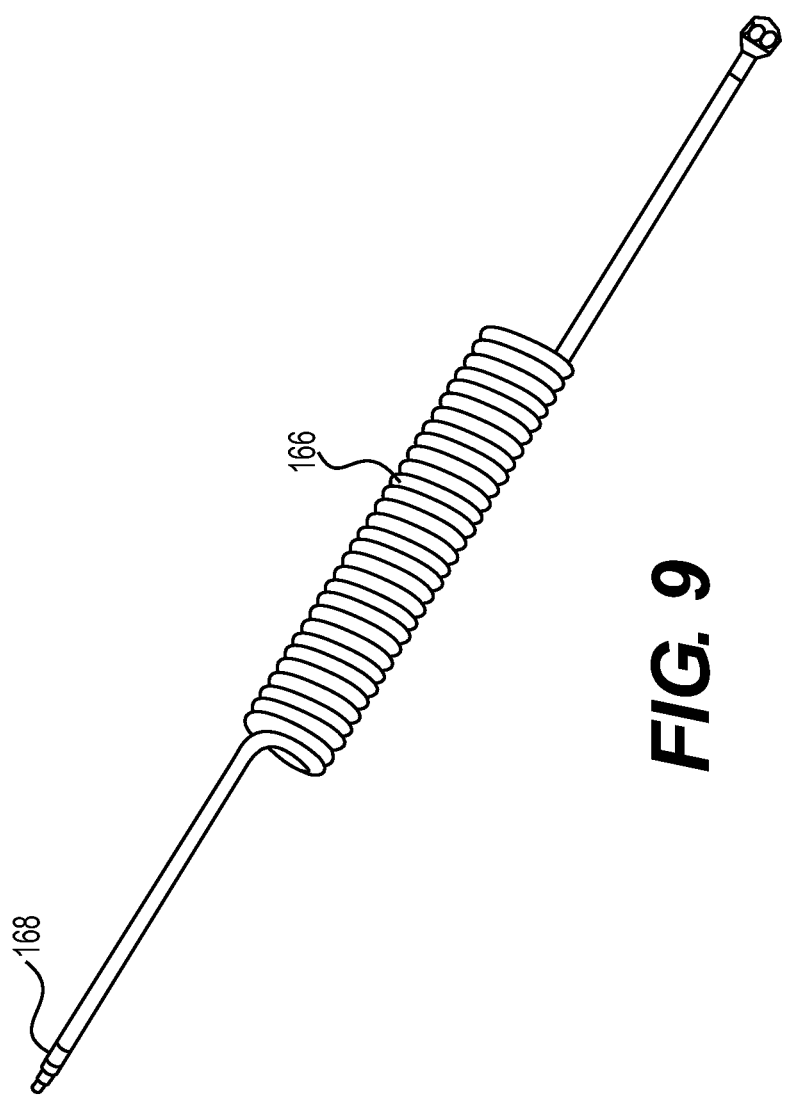
FIG. 9 is a side view of a hose to be connected to an auxiliary air output of the pneumatic system of FIG. 6.

As can be seen in FIGS. 7 and 8, the accumulator chambers 140, 146 and 152 are connected to the bracket 104 by straps 160.

The auxiliary valve 132 is connected to an auxiliary air output hose 162 that is connected to an auxiliary air output 164. In the present embodiment, the auxiliary air output 164 is a "quick-connect" connector of the type typically used in pneumatic applications, such as with pneumatic tools, including a built-in check valve. The auxiliary air output 164 is connected to the frame 12 rearwardly of the seats 18. It is contemplated that the auxiliary air output 164 could be located anywhere on the RUV 10 where it would be accessible. An air hose 166, shown in FIG. 9, having a connector 168 that is complementary to the auxiliary air output 164, can be connected to the auxiliary air output 164. By opening the auxiliary valve 132 and turning on the compressor 102, the air hose 166, once connected to the auxiliary air output 164, can be used for various applications, such as for inflating a tire for example. When not in use, the air hose 166, is disconnected from the auxiliary air output 164, and is stored in a storage compartments of the RUV 10, such as the cargo box 11.

The exhaust valve 134 is connected to a hose 170 that is connected to the T-connector 116. As will be explained in greater detail below, by opening the valve 112 in the compressor 102, the exhaust valve 134 and one of the air spring valves 126, 128, 130, air in the air spring(s) 56 or 58 corresponding to the opened air spring valve 126, 128 or 130 is vented to the atmosphere thus reducing the air pressure inside of the air spring(s) 56 or 58 corresponding to the opened air spring valve 126, 128 or 130. When the valves 112, 134 and one of air spring valves 126, 128, 130 are opened, air from the air spring(s) 56 or 58 corresponding to the opened air spring valve 126, 128 or 130 flows back to the air passage 124 via its fluid connection to the air passage, and then flows successively through the exhaust valve 134, the hose 170, the T-connector 116, the hose 114, the valve 112, the compressor 102, the hose 110, the filter 108, the hose 106, the air box 74 and finally to the atmosphere. It is contemplated that the end of the hose 170 that is not connected to the exhaust valve 134 could be opened to the atmosphere. It is also contemplated that the hose 170 could be omitted and that the exhaust valve 134 could communicate directly with the atmosphere.

The air pressure sensor 136 senses the air pressure inside the air passage 124 and sends a signal representative of this air pressure to the ECU 100. By opening one of the air spring valves 126, 128, 130 or the auxiliary valve 132, the pressure inside the air passage 124 changes to correspond to the air pressure in a corresponding one of the front left air spring 56, the front right air spring 56, the rear air springs 58, and the auxiliary air output hose 162. As such, only the air pressure sensor 136 is needed to sense the air pressure inside the air springs 56, 58 and the auxiliary air output hose 162. It is contemplated that the air pressure sensor 134 could be outside of the manifold 122 and be connected to the hose 120. When the RUV 10 is in motion, especially over rough terrain, the air pressure inside the air springs 56, 58 constantly fluctuates. Therefore, when the RUV 10 is in motion, the ECU 100 uses an average of the air pressure readings from the pressure sensor 136 over time to determine the air pressure that would be read should the RUV 10 be at rest. It is contemplated that sensors could also be used to sense the degree of compression of the air springs 56, 58 to assist in making this determination.

The pressure in the air springs 56, 58 can be adjusted in two different modes. These are a manual mode and an automatic mode. The user of the RUV 10 selects which of the mode is to be used via a manual/automatic mode selection switch 172 (FIG. 10). The manual/automatic mode selection switch 172 is electrically connected to the ECU 100 to provide the ECU 100 with a signal indicative of the selected mode. The manual/automatic mode selection switch 172 is provided in the cockpit area 22 within reach of a driver of the RUV 10.

In the manual mode, the user first selects for which of the front and rear air springs 56, 58 the air pressure is to be adjusted via a front/rear selector 174 (FIG. 10), which can be in the form of a switch. The front/rear selector 174 is electrically connected to the ECU 100 to provide the ECU 100 with a signal indicative of the ones of the front and rear air springs 56, 58 for which pressure is to be adjusted. This allows the user to set a pressure in the front air springs 56 that is different from the one in the rear air springs 58. It is contemplated that the front/rear selector 174 could be omitted, in which case the pressure in the pressure in the front and rear air springs 56, 58 would be the same. It is contemplated that a further switch could be provided or that the front/rear selector 174 could be provided with additional positions to allow the pressure in the front right and front left air springs 56 to be adjusted independently. To increase or decreases the pressure in the selected ones of the front and rear air springs 56, 58 in the manual mode, the user the presses one of a pressure up (Pup) and a pressure down (Pdown) button 176 (FIG. 10). The buttons 176 are electrically connected to the ECU 100. It is contemplated that the buttons 176 could be replaced by a single rocker switch or similar dual position input device. The front/rear selector 174 and the buttons 176 are provided in the cockpit area 22 within reach of a driver of the RUV 10. A pressure gauge 178 (FIG. 10) is provided in the cockpit area 22 where it can be seen by the driver of the RUV 10. The pressure gauge 178 is fluidly connected to the air passage 124 and as such provides a visual indication to the driver of a pressure in the ones of the air springs 56, 58 for which the pressure is being adjusted. It is contemplated that the gauge 178 could alternatively be electrically connected to the pressure sensor 136 directly or via the ECU 100 to provide a graphical or numerical indication of the pressure in the ones of the air springs 56, 58 for which the pressure is being adjusted. In this case, it is contemplated that the gauge 178 could be omitted and that the gauge 68 of the display cluster 60 could display the information that would have been displayed by the gauge 178. The manner in which the pressure is adjusted in the manual mode will be described in greater detail below.

In the automatic mode, the user selects one of a plurality of air pressure settings for the front and rear air springs 56, 58. In the present embodiment, each of the air pressure settings provides a pressure in the front air springs 56 that is different from the one in the rear air springs 56, 58. However, it is contemplated that at least some of the air pressure settings could set the air pressure in the front and rear air springs 56, 58 to be the same. To select a an air pressure setting, the user of the RUV 10 first enters an air pressure selection screen of the gauge 68 using the mode button 70 of the cluster 60. The user then selects a desired air pressure setting using the set button 72. It is contemplated that the RUV 10 could be provided with dedicated buttons and/or switches to select the air pressure setting instead of using the mode and set buttons 70, 72. In the example shown in FIG. 4, the user can select one of six air pressure settings. In FIG. 3, the user has selected setting 3. It is contemplated that instead of labeling the presets with numbers as shown, that the settings could be labeled with qualitative labels regarding the suspension, such as "smooth", "firm", "sport", etc. It is contemplated that the air pressures for the front and rear air springs corresponding to the setting could be displayed on the gauge 68 of the cluster 60. Although in the present embodiment, the various settings are programmed by a manufacturer of the RUV 10, it is contemplated that one or more of the settings in the automatic mode could be programmed by the user by saving changing the air pressure in the air springs 56, 58 in the manual mode and then saving these air pressures to one of the settings. The manner in which the pressure is adjusted in the automatic mode will be described in greater detail below.

Turning now to FIGS. 11A to 11H, an embodiment of a method of operating the pneumatic system of the RUV 10 will be described. The method is initiated at 200 in FIG. 11A.

At step 202, the ECU 100 first determines if the vehicle 10 is in operation by determining if the speed of the engine 29 is greater than 0 revolution per minute (RPM). In this embodiment, an engine speed sensor (not shown) senses a speed of rotation of a crankshaft or output shaft (not shown) of the engine 29 and sends a signal representative of this speed to the ECU 100 to allow the ECU 100 to make this determination. If at step 202 the engine speed is greater than 0 RPM, than it is determined that the RUV 10 is in operation and the method proceeds to step 204. If it is determined that the RUV 10 is not in operation, than step 202 is repeated. It is contemplated that the ECU 100 could determine if the RUV 10 is in operation in other ways. For example, the ECU 100 could read a power output of an alternator of the engine 29 to determine if the vehicle 10 is in operation.

At step 204, the ECU 100 determines if a change in the air pressure levels in the air springs 56 and/or the air springs 58 is requested. The ECU 100 determines that a change in the air pressure levels has been requested if one of the Pup and Pdown buttons 176 has been pressed or if the set button 72 has been pressed while the air pressure selection screen of the gauge 68 is displayed on the cluster 60.

If at step 204 a change in the air pressure levels in the air springs 56 and/or the air springs 58 has been requested, then at step 206 the ECU 100 determines if the change in air pressure in the air springs 56 and/or the air springs 58 is to be made in the manual mode or the automatic mode. In the present embodiment, the ECU 100 does this by determining a position of the manual/automatic mode selection switch 172. It is contemplated that the manual/automatic mode selection switch 172 could be omitted and that the ECU 100 would determine that the change in air pressure in the air springs 56 and/or the air springs 58 is to be made in the manual mode when it is one of the Pup and Pdown buttons 176 that has been pressed and that the change in air pressure in the air springs 56 and/or the air springs 58 is to be made in the automatic mode when the set button 72 has been pressed while the air pressure selection screen of the gauge 68 is displayed on the cluster 60. If the switch 172 is in the position corresponding to the manual mode, the ECU 100 proceeds to block A, the steps of which are illustrated in detail in FIG. 11B and will be described below. If the switch 172 is in the position corresponding to the automatic mode, the ECU 100 proceeds to block B, the steps of which are illustrated in detail in FIG. 11C and will be described below.

Figure 11A:
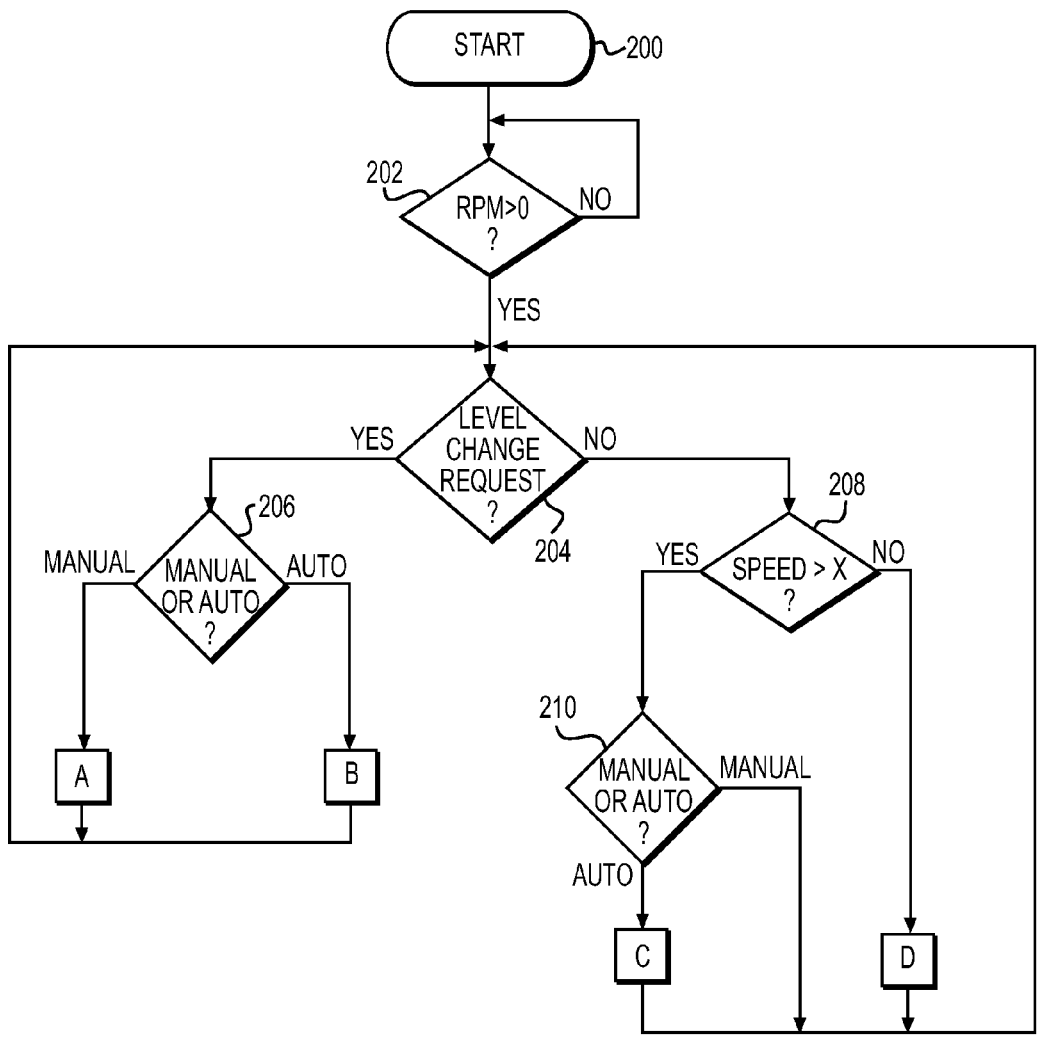
FIGS. 11A to 11H illustrate an embodiment of a method of operating the pneumatic system of the RUV of FIG. 1.
Figure 11B:
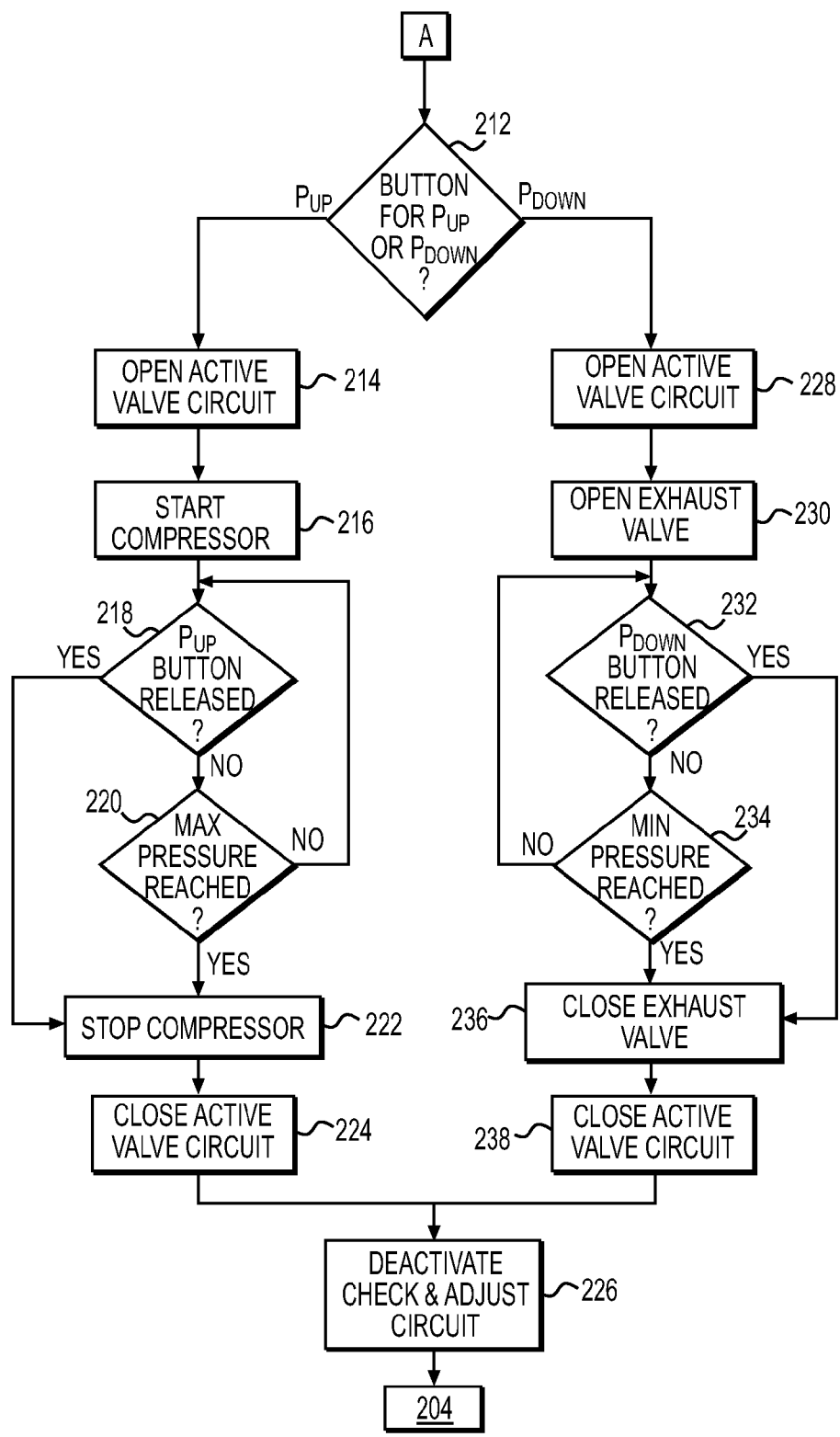

If from step 206, the ECU 100 proceeds to block A, then, as shown in FIG. 11B, at step 212 the ECU 100 determines which of the Pup and Pdown buttons 176 has been pressed.

If at step 212, the ECU 100 determines that the Pup button has been pressed, which indicates that the user desires to increase the air pressure in the front air springs 56 or the rear air springs 58, the ECU 100 proceeds to step 214. At step 214, the ECU 100 opens the active valve circuit. This means that based on the position of the front/rear selector 174, the ECU 100 determines if the user desires to increase the air pressure in the front air springs 56 or the rear air spring 58. If the position of the selector 174 indicates that the user desires to increase the pressure in the front air spring 56, then at step 214 the ECU 100 causes both of the air spring valves 126 and 128 to open. If the position of the selector 174 indicates that the user desires to increase the pressure in the rear air spring 58, then at step 214 the ECU 100 causes the air spring valve 130 to open. Then at step 216, the ECU 100 sends a signal to start the air compressor 102 such that compressed air is supplied to the ones of the front and rear air springs 56, 58 whose corresponding air spring valve 126, 128, or 130 has been opened at step 214, thus increasing the air pressure in these air springs 56 or 58. Then at step 218, the ECU 100 determines if the Pup button 176 has been released. If the Pup button has been released, then the ECU 100 proceeds to step 222 where it sends a signal to stop the air compressor 102. If at step 218, the Pup button 176 is still being pressed, then at step 220, based on the readings of the pressure sensor 136, the ECU 100 determines if a maximum allowable air pressure for the air springs 56 or 58 (as the case may be) has been reached. If the maximum allowable air pressure has not been reached, then the ECU 100 returns to step 218. If the maximum allowable air pressure has been reached, then the ECU 100 proceeds to step 222 where it sends a signal to stop the air compressor 102. From step 222, the ECU 100 proceeds to step 224 where the active valve circuit is closed, which means that the ECU 100 causes the air spring valve(s) 126, 128, 130 that was/were opened at step 214 to now be closed. From step 224, the ECU 100 proceeds to step 226 where it deactivates a check and adjust circuit 226. The check and adjust circuit is a function of the ECU 100, such as that described with respect to block C (FIG. 11D) described below, where the ECU 100 controls the air spring valves 126, 128, 130, the exhaust valve 134 and the air compressor 102 to maintain the air pressures inside the air springs 56, 58 within a certain range of the pressures that have been set for the air springs 56, 58 without any user intervention. When the manual mode has been selected at step 206, this function is deactivated at step 226 which means that the user has to manually adjust the air pressure in the air springs by pressing the Pup and Pdown buttons 176 in order to maintain a desired air pressure level in the air springs should it vary over time, due to a leak in the pneumatic system or a change in temperature for example. It is contemplated that step 226 could be omitted.

If at step 212, the ECU 100 determines that the Pdown button has been pressed, which indicates that the user desires to decrease the air pressure in the front air springs 56 or the rear air springs 58, the ECU 100 proceeds to step 228. At step 228, the ECU 100 opens the active valve circuit. This means that based on the position of the front/rear selector 174, the ECU 100 determines if the user desires to decrease the air pressure in the front air springs 56 or the rear air spring 58. If the position of the selector 174 indicates that the user desires to decrease the pressure in the front air spring 56, then at step 228 the ECU 100 causes both of the air spring valves 126 and 128 to open. If the position of the selector 174 indicates that the user desires to decrease the pressure in the rear air spring 58, then at step 228 the ECU 100 causes the air spring valve 130 to open. Then at step 230, the ECU 100 causes the exhaust valve 134, and the valve 112 in the air compressor, to open such that air in the ones of the front and rear air springs 56, 58 whose corresponding air spring valve 126, 128, or 130 has been opened at step 228 is exhausted to the atmosphere, thus reducing the air pressure in these air springs 56 or 58. Then at step 232, the ECU 100 determines if the Pdown button 176 has been released. If the Pdown button has been released, then the ECU 100 proceeds to step 236 where it sends a signal to close the exhaust valve 134 and the valve 112. If at step 232, the Pdown button 176 is still being pressed, then at step 234, based on the readings of the pressure sensor 136, the ECU 100 determines if a minimum allowable air pressure for the air springs 56 or 58 (as the case may be) has been reached. If the minimum allowable air pressure has not been reached, then the ECU 100 returns to step 232. If the minimum allowable air pressure has been reached, then the ECU 100 proceeds to step 236 where it sends a signal to close the exhaust valve 134 and the valve 112. From step 236, the ECU 100 proceeds to step 238 where the active valve circuit is closed, which means that the ECU 100 causes the air spring valve(s) 126, 128, 130 that was/were opened at step 228 to now be closed. From step 238, the ECU 100 proceeds to step 226 and back to step 204 as described above.

Figure 11C:
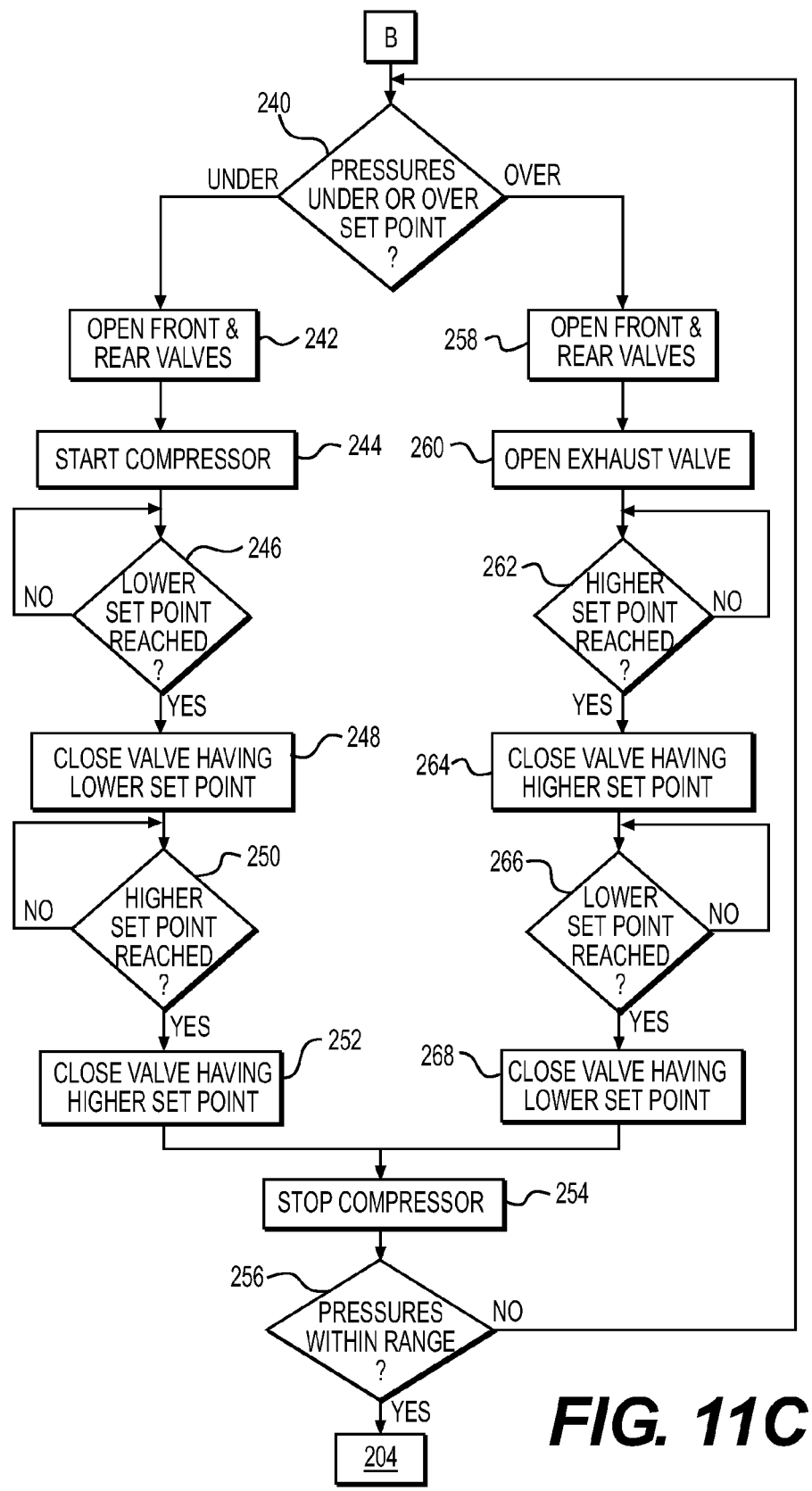
Figure 11D:
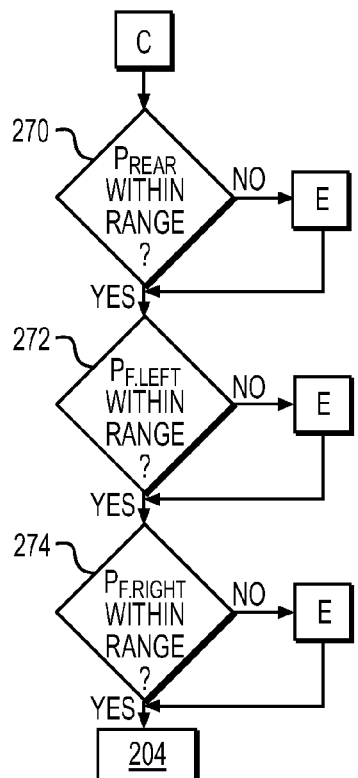
Figure 11E:
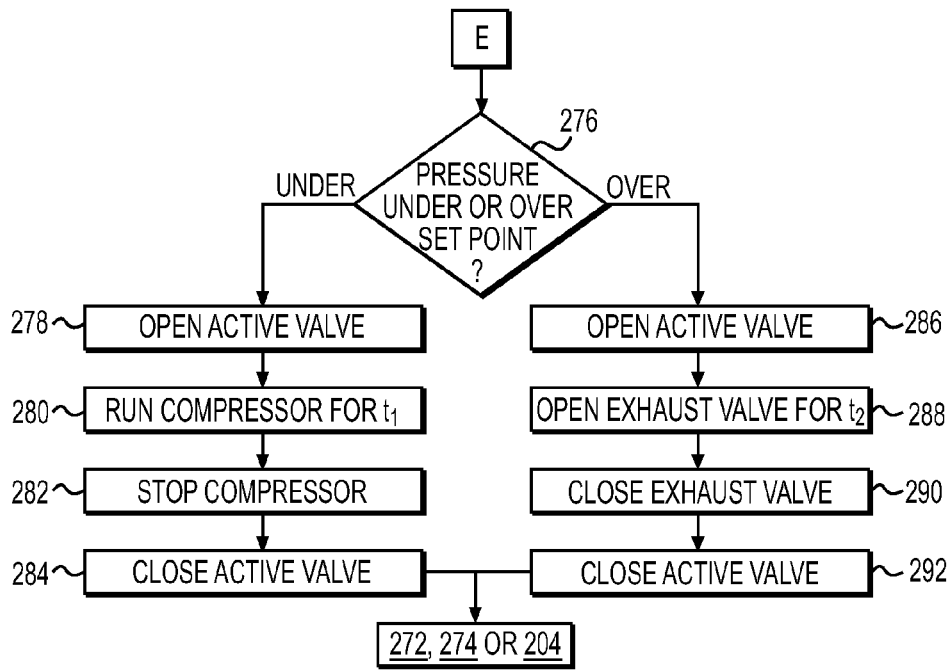

If from step 206, the ECU 100 proceeds to block B, then, as shown in FIG. 11C, at step 240 the ECU determines if the current air pressures in the air springs 56 and 58 are under or over the air pressures corresponding to the selected setting (i.e. set point). The current air pressures in the air springs 56 and 58 is determined from readings of the pressure sensor 136 or is known from the values of the air pressures corresponding to the air pressure setting that was selected prior to requesting a change in air pressure level at step 204. As previously explained, in the present embodiment, for each air pressure setting the desired air pressure for the front air springs 56 is different than the desired air pressure for the rear air springs 56. As such one set of air springs 56 or 58 has a lower pressure set point than the other set of air springs 56 or 58. For simplicity, steps 242 to 256 will be described below for an air pressure setting in which the front air springs 56 are to be set at a lower pressure than the rear air springs 58. As such, the front air springs 56 are said to have a lower set point than the rear air springs 58. It should be understood that it is contemplated that the rear air springs 58 could be the ones with the lower set point.

If at step 240 it is determined that the current air pressures in the air springs 56, 58 are lower (under) the air pressures corresponding to the newly selected air pressure setting, then at step 242 the ECU 100 causes all of the air spring valves 126, 128 and 130 to open. Then at step 244, the ECU 100 sends a signal to start the air compressor 102 such that compressed air is supplied to the front and rear air springs 56, 58, thus increasing the air pressure in the air springs 56 or 58. As step 246, based on readings from the pressure sensor 136, the ECU 100 determines if the lower pressure set point has been reached. If not, then step 246 is repeated. If the lower pressure set point is reached, then, in the present example, at step 248 the ECU 100 causes the air spring valves 126 and 128 to close, such that only the air pressure inside the rear air springs 58 continues to increase. From step 248, the ECU 100 proceeds to step 250 where, based on readings from the pressure sensor 136, the ECU 100 determines if the higher pressure set point has been reached. If not, then step 250 is repeated. If the higher pressure set point is reached, then, in the present example, at step 252 the ECU 100 causes the air spring valve 130 to close. From step 252, the ECU 100 sends a signal to stop the air compressor 102 at step 254. Then, at step 256, by opening the air spring valves 126, 128 and 130 one at a time, the ECU 100 checks to ensure that each of the front air springs 56 and that the rear air springs 58 are within a predetermined acceptable range from their corresponding pressure set points based on readings from the air pressure sensor 136. If not, the ECU 100 returns to step 240. If they are within the predetermined range, the ECU 100 returns to step 204 in FIG. 11A.

If at step 240 it is determined that the current air pressures in the air springs 56, 58 are higher (over) the air pressures corresponding to the newly selected air pressure setting, then at step 258 the ECU 100 causes all of the air spring valves 126, 128 and 130 to open. Then at step 260, the ECU 100 causes the exhaust valve 134 and the valve 112 in the air compressor 102 to open such that air in the front and rear air springs 56, 58 is exhausted to the atmosphere, thus decreasing the air pressure in the air springs 56 or 58. As step 262, based on readings from the pressure sensor 136, the ECU 100 determines if the higher pressure set point has been reached. If not, then step 262 is repeated. If the higher pressure set point is reached, then, in the present example, at step 264 the ECU 100 causes the air spring valve 130 to close, such that only the air pressure inside the front air springs 56 continues to increase. From step 264, the ECU 100 proceeds to step 266 where, based on readings from the pressure sensor 136, the ECU 100 determines if the lower pressure set point has been reached. If not, then step 266 is repeated. If the lower pressure set point is reached, then, in the present example, at step 268 the ECU 100 causes the air spring valves 126 and 128 to close. From step 268, steps 254 and 256 are performed as described above.

Returning now to step 204, if a this step the ECU 100 determines that no change in the air pressures in the air springs 56 and/or 58 has been requested, then the ECU 100 determines if the RUV 10 is stationary. One of the reasons for making this determination is that the pneumatic system, as controlled by the ECU 100, only permits the air compressor 102 to supply compressed air via the auxiliary valve 132, to inflate a tire for example, when the RUV 10 is determined to be stationary. In the present embodiment, the ECU 100 does this at step 208 by comparing the actual speed of the RUV 10 to a predetermined vehicle speed X. In one embodiment, the value of the predetermined vehicle speed X is 5 km/h. In another embodiment, the value of the predetermined vehicle speed X is 0 km/h. The actual speed of the RUV 10 is sensed by a vehicle speed sensor 180 (FIG. 10). The vehicle speed sensor 180 is electrically connected to the ECU 100 to send a signal representative of the actual vehicle speed to the ECU 100. The vehicle speed sensor 180 senses a speed of rotation of one of the wheels 14 or of a shaft associated with the wheels 14 and the ECU 100 can then determine the vehicle speed based on this rotational speed. Alternatively, the actual vehicle speed of the RUV 10 could be determined by a GPS unit provided in the vehicle 10 and in electronic communication with the ECU 100. If at step 208 the actual vehicle speed is greater than the predetermined vehicle speed X, then the RUV 10 is not considered to be stationary and the ECU 100 proceeds to step 210. If at step 208 the actual vehicle speed is less than or equal to the predetermined vehicle speed X, then the RUV 10 is considered to be stationary and the ECU 100 proceeds block D which will be described below with respect to FIG. 11F. As would be understood, for embodiments where the value of X is greater than zero (for example 5 km/h), the RUV 10 may not actually be stationary (2 km/h for example), however the non-zero value of X is selected such that any speed lower than this value is sufficiently low for the ECU 100 to consider the RUV 10 to be stationary.

It is contemplated that at step 208 a vehicle condition other than vehicle speed could be used to determine if the RUV 10 is stationary by using a vehicle condition sensor other than a vehicle speed sensor 180. For example, the RUV 10 could be provided with a parking brake sensor 182 (FIG. 10) associated with a parking brake (not shown) of the RUV 10 and electrically connected to the ECU 100. The parking brake sensor 182 senses if the parking brake of the RUV has been engaged. In such an example, if the parking brake has been engaged, then the RUV 10 is considered to be stationary and the ECU 100 would proceed to block D and if the parking brake is not engaged, then the RUV 10 is considered not to be stationary (even though it may actually be) and ECU 100 would proceed to step 210. In another example, RUV 10 could be provided with a shifter position sensor 184 (FIG. 10) associated with the shifter 46 of the RUV 10 and electrically connected to the ECU 100. The shifter position sensor 184 senses in which shift position (park, neutral, reverse, forward high, forward low) the shifter 46 is located. In such an example, if the shifter 46 is sensed to be in the park or neutral shift position, then the RUV 10 is considered to be stationary and the ECU 100 would proceed to block D and if the shifter 46 is sensed to be in any other position, then the RUV 10 is considered not to be stationary and ECU 100 would proceed to step 210.

If at step 208 the actual vehicle speed is greater than the predetermined vehicle speed X, then at step 210 the ECU 100 determines if the pneumatic system is being operated in the manual or automatic mode. This is done in the same manner as described above with respect to step 206. If the pneumatic system is being operated in the manual mode, than the ECU 100 returns to step 204. If the pneumatic system is being operated in the automatic mode, then the ECU 100 proceeds to step 270 of block C described below with respect to FIG. 11D.

At step 270 (FIG. 11D), the ECU 100 determines if a pressure in the rear air springs 58 ($P_{rear}$), as sensed by the air pressure sensor 136, is within a rear, predetermined acceptable range from the air pressure set point for the rear air springs 58 corresponding to the selected air pressure setting. If the air pressure in the rear air springs 58 is within the acceptable range, then the ECU 100 proceeds to step 272. In one embodiment, the ECU 100 applies a time delay (5 seconds for example) prior to executing step 272. If the air pressure in the rear air springs 58 is outside of the acceptable range, then the ECU 100 proceeds to block E described below.

Upon reaching block E from step 270, the ECU 100 determines if the pressure, in this case the pressure of the rear air springs 58, is under or over the air pressure set point for the rear air springs 58 corresponding to the selected air pressure setting. If the air pressure of the rear air springs 58 is under the air pressure set point, then at step 278 the ECU 100 causes the active valve, which in this case is the air spring valve 130, to open (or to remain open). Then at step 280, the ECU 100 sends a signal to run the air compressor 102 for a period of time t1 in order to increase the air pressure in the rear air springs 58. The time t1 is the time ECU 100 estimates it will take to increase the current air pressure in the air springs 58 to the air pressure set point. The ECU 100 calculates the time t1 based at least on the current air pressure in the rear air springs 58, the air pressure set point, and the output characteristics of the air compressor 102. Once time t1 has elapsed, at step 282 the ECU 100 sends a signal to stop the compressor 102. The ECU 100 then causes the air spring valve 130 to close at step 284. From step 284, the ECU 100 proceeds to step 272. If at step 276 it is determined that the air pressure of the rear air springs 58 is over the air pressure set point, then at step 286 the ECU 100 causes the air spring valve 130 to open (or to remain open). Then at step 288, the ECU 100 causes the exhaust valve 134 and the valve 112 to open for a period of time t2 in order to decrease the air pressure in the rear air springs 58. The time t2 is the time ECU 100 estimates it will take to decrease the current air pressure in the air springs 58 to the air pressure set point. The ECU 100 calculates the time t2 based at least on the current air pressure in the rear air springs 58, the air pressure set point, and the rate at which air is exhausted to the atmosphere. Once time t2 has elapsed, at step 290 the ECU 100 causes the exhaust valve 134 and the valve 112 to close. The ECU 100 then causes the air spring valve 130 to close at step 292. From step 292, the ECU 100 proceeds to step 272.

Returning to block C in FIG. 11D, at step 272 the ECU 100 determines if a pressure in the front left air spring 56 ($P_{F.Left}$), as sensed by the air pressure sensor 136, is within a predetermined acceptable range from the air pressure set point for the front air springs 56 corresponding to the selected air pressure setting. If the air pressure in the front left air spring 56 is within the acceptable range, then the ECU 100 proceeds to step 274. In one embodiment, the ECU 100 applies a time delay (5 seconds for example) prior to executing step 274. If the air pressure in the front left air spring 56 is outside of the acceptable range, then the ECU 100 proceeds to block E. The ECU 100 proceeds through block E from step 272 as described above except that for steps 276, 280, 288 it uses the air pressure of the front left air spring 56 and the pressure set point for the front air springs 56, for steps 278, 284, 286, 292 the active valve is the air spring valve 126, and from steps 284, 292 the ECU 100 proceeds to step 274.

At step 274 the ECU 100 determines if a pressure in the front right air spring 56 ($P_{F.Right}$), as sensed by the air pressure sensor 136, is within a predetermined acceptable range from the air pressure set point for the front air springs 56 corresponding to the selected air pressure setting. If the air pressure in the front right air spring 56 is within the acceptable range, then the ECU 100 returns to step 204. In one embodiment, the ECU 100 applies a time delay (5 seconds for example) prior to executing step 204. If the air pressure in the front right air spring 56 is outside of the acceptable range, then the ECU 100 proceeds to block E. The ECU 100 proceeds through block E from step 274 as described above except that for steps 276, 280, 288 it uses the air pressure of the front right air spring 56 and the pressure set point for the front air springs 56, for steps 278, 284, 286, 292 the active valve is the air spring valve 128, and from steps 284, 292 the ECU 100 proceeds to step 204.

Figure 11F:
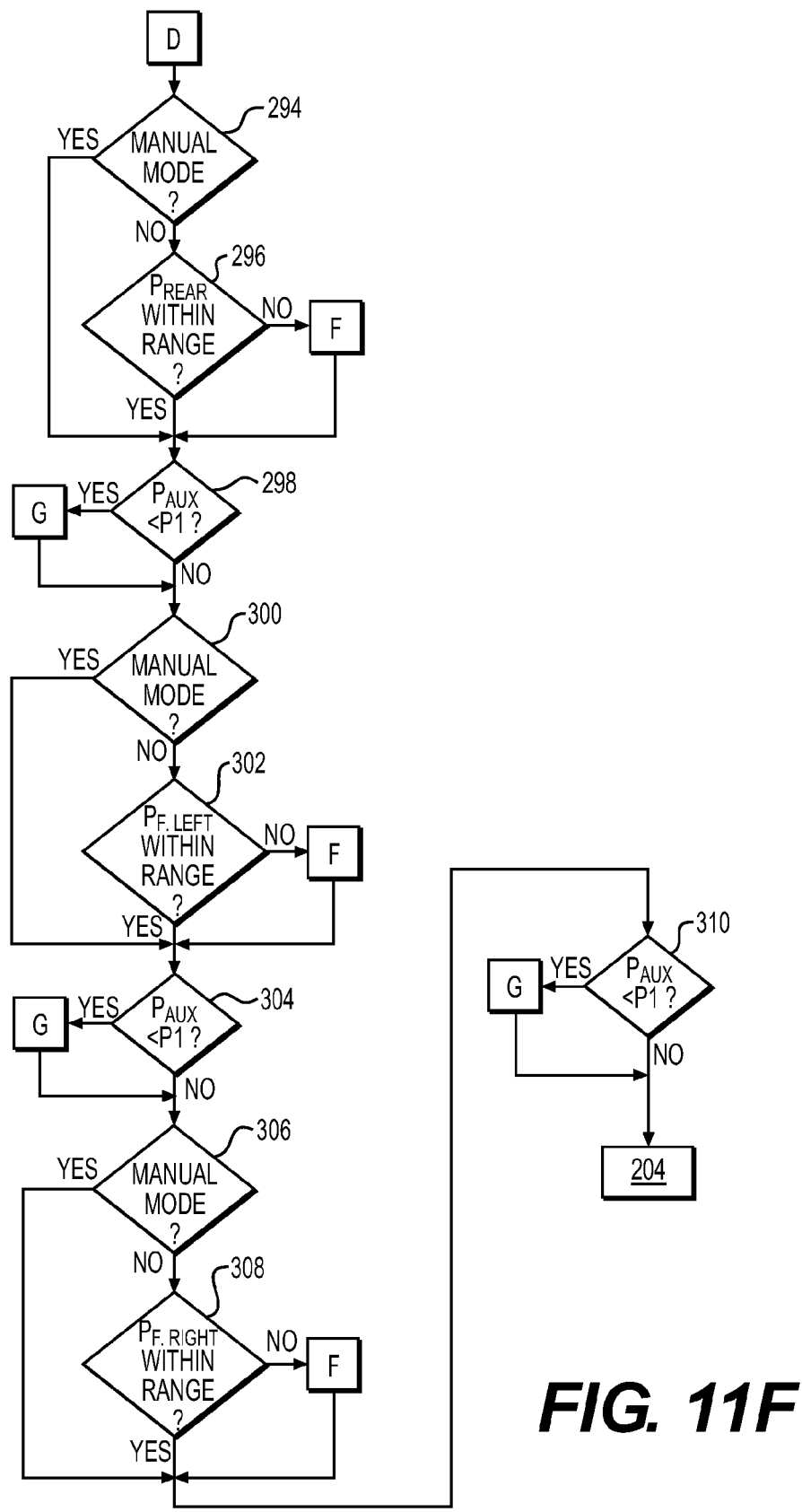
Figure 11G:
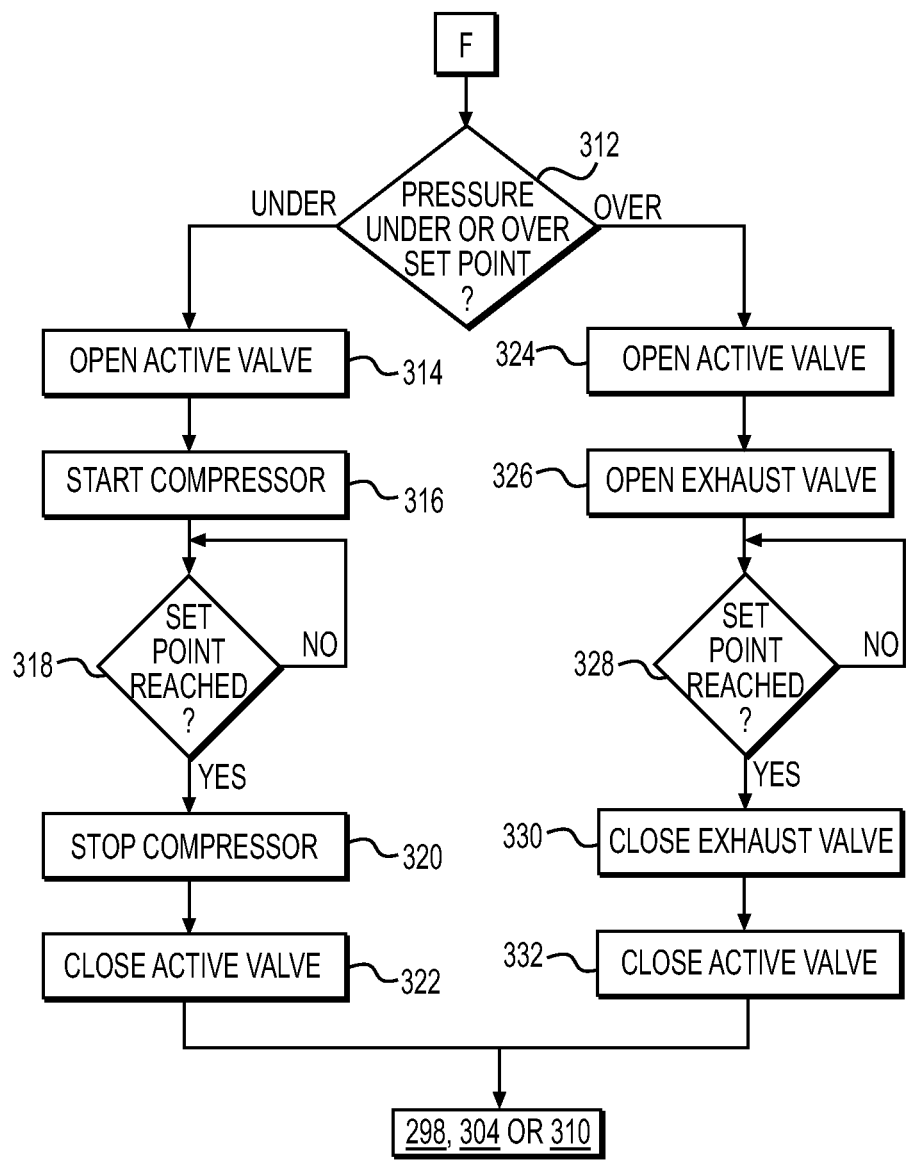
Figure 11H:
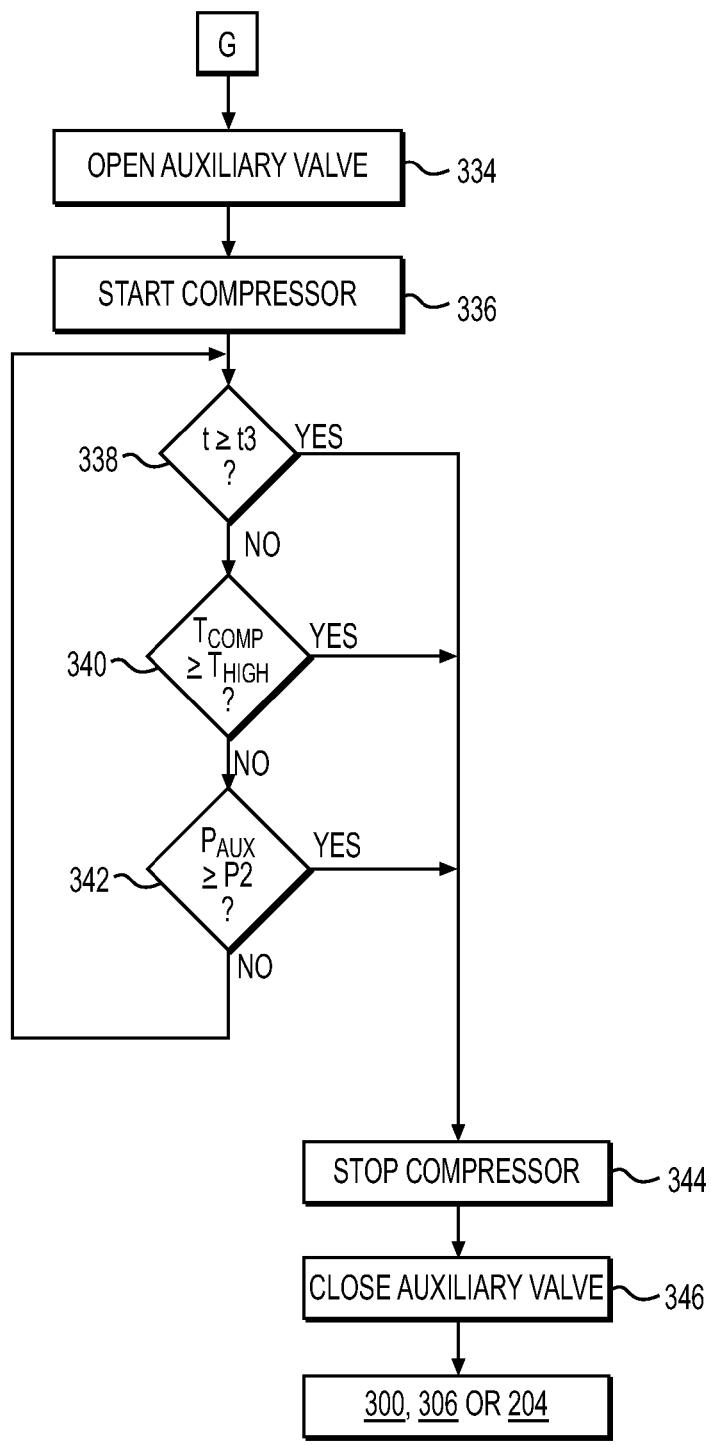

If at step 208 the actual vehicle speed is less than or equal to the predetermined vehicle speed X, then the ECU 100 proceeds to step 294 of block D (FIG. 11F). At step 294, the ECU 100 determines if the pneumatic system is being operated in the manual or automatic mode. This is done in the same manner as described above with respect to step 206. If the pneumatic system is being operated in the manual mode, than the ECU 100 proceeds to step 298. If the pneumatic system is being operated in the automatic mode, then the ECU 100 proceeds to step 296.

At step 296, the ECU 100 determines if a pressure in the rear air springs 58 ($P_{rear}$), as sensed by the air pressure sensor 136, is within a predetermined rear, acceptable range from the air pressure set point for the rear air springs 58 corresponding to the selected air pressure setting. If the air pressure in the rear air springs 58 is within the acceptable range, then the ECU 100 proceeds to step 298. In one embodiment, the ECU 100 applies a time delay (5 seconds for example) prior to executing step 298. If the air pressure in the rear air springs 58 is outside of the acceptable range, then the ECU 100 proceeds to block F described below with respect to FIG. 11G.

Upon reaching block F from step 296, the ECU 100 determines if the pressure, in this case the pressure of the rear air springs 58, is under or over the air pressure set point for the rear air springs 58 corresponding to the selected air pressure setting. If the air pressure of the rear air springs 58 is under the air pressure set point, then at step 314 the ECU 100 causes the active valve, which in this case is the air spring valve 130, to open (or to remain open). Then at step 316, the ECU 100 sends a signal to run the air compressor 102 in order to increase the air pressure in the rear air springs 58. Then at step 318, the ECU 100 determines if the air pressure in the rear air springs 58, as sensed by the air pressure sensor 136, has reached its pressure set point. If the air pressure inside the rear air springs 58 is still under the pressure set point, step 318 is repeated. If the air pressure inside the rear air springs 58 has reached the pressure set point, then at step 320 the ECU 100 sends a signal to stop the compressor 102. The ECU 100 then causes the air spring valve 130 to close at step 322. From step 322, the ECU 100 proceeds to step 298. If at step 312 it is determined that the air pressure of the rear air springs 58 is over the air pressure set point, then at step 324 the ECU 100 causes the air spring valve 130 to open (or to remain open). Then at step 326, the ECU 100 causes the exhaust valve 134 and the valve 112 to open in order to decrease the air pressure in the rear air springs 58. Then at step 328, the ECU 100 determines if the air pressure in the rear air springs 58, as sensed by the air pressure sensor 136, has reached its pressure set point. If the air pressure inside the rear air springs 58 is still over the pressure set point, step 328 is repeated. If the air pressure inside the rear air springs 58 has reached the pressure set point, then at step 330 the ECU 100 causes the exhaust valve 134 and the valve 112 to close. The ECU 100 then causes the air spring valve 130 to close at step 332. From step 332, the ECU 100 proceeds to step 298.

Returning to block D in FIG. 11F, at step 298 the ECU 100 determines if an air pressure inside the auxiliary air output hose 162 ($P_{aux}$) is below a predetermined air pressure P1. In one embodiment, P1 is 30 psi. If the air pressure inside the auxiliary air output hose 162 is above or equal to P1, the ECU 100 proceeds to step 300. In one embodiment, the ECU 100 applies a time delay (5 seconds for example) prior to executing step 300. If the air pressure inside the auxiliary air output hose 162 is less than P1, then the ECU proceeds to step 334 of block G described below with respect to FIG. 11H. Having an air pressure inside the auxiliary air output hose 162 that is below P1 could indicate that the air hose 166 is connected between the auxiliary air output 164 and something to which pressurized air is to be supplied, such as a tire or a pneumatic tool, which causes air to leave the auxiliary air output hose 162. In response, the ECU 100 sends a signal to run the air compressor 102, as described below with respect to block G, in order to supply pressurized air through the auxiliary air output 164 and the air hose 166.

At step 334 (FIG. 11H) of block G, the ECU 100 causes the auxiliary valve 132 to open. Then at step 336, the ECU 100 sends a signal to start the compressor 102. Then at step 338, the ECU 100 determines if the air compressor 102 has been liming consecutively for at least a predetermined time t3. The time t3 corresponds to a time of continuous operation of the air compressor 102 which, if exceeded, may cause components of the air compressor 102 to become damaged. In one embodiment, the time t3 is 6 minutes. The value of t3 will depend on the make and model of the air compressor 102 being used. If at step 338, time t3 has been reached or exceeded, then the ECU 100 proceeds to step 344 and sends a signal to stop the air compressor 102. If at step 338 it is determined that the air compressor 102 has been operating for less than time t3, then at step 340 the ECU 100 determines if a temperature of the air compressor 102 ($T_{comp}$) is higher than or equal to a predetermine temperature ($T_{high}$). The temperature of the air compressor 102 is sensed by a temperature sensor 186 that is electrically connected to the ECU 100. The predetermined temperature is a temperature above which the air compressor 102 could overheat and as a result may become damaged. If at step 340, the predetermined temperature has been reached or exceeded, then the ECU 100 proceeds to step 344 and sends a signal to stop the air compressor 102. If at step 340 it is determined that the temperature of the air compressor 102 is less than the predetermined temperature, then at step 342 the ECU 100 determines if the air pressure in the auxiliary air output hose 162 is greater than or equal to a predetermined pressure P2. The pressure P2 is an air pressure above which components of the pneumatic system may become damaged. In one embodiment, the pressure P2 is 70 psi. If at step 342, the air pressure in the auxiliary air output hose 162 is less than pressure P2, then the ECU 100 returns to step 338. If at step 342, the predetermined pressure P2 has been reached or exceeded, then the ECU 100 proceeds to step 344 and sends a signal to stop the air compressor 102. As should be understood, the air pressure inside the auxiliary air output hose 162 will quickly reach the predetermined pressure P2 once the air hose 166 is disconnected from the auxiliary air output 164 (or once the air hose 166 is disconnected from the device requiring pressurized air should the air hose 166 be provided with a valve that is closed once the hose 166 disconnected from the device). From step 344, the ECU 100 causes the auxiliary valve 132 to close at step 346. From step 346, the ECU proceeds to step 300.

Returning to block D in FIG. 11F, at step 300, the ECU 100 determines if the pneumatic system is being operated in the manual or automatic mode. This is done in the same manner as described above with respect to step 206. If the pneumatic system is being operated in the manual mode, than the ECU 100 proceeds to step 304. If the pneumatic system is being operated in the automatic mode, then the ECU 100 proceeds to step 302.

At step 302, the ECU 100 determines if a pressure in the front left air spring 56 ($P_{F.Left}$), as sensed by the air pressure sensor 136, is within a predetermined acceptable range from the air pressure set point for the front air springs 56 corresponding to the selected air pressure setting. If the air pressure in the front left air spring 56 is within the acceptable range, then the ECU 100 proceeds to step 304. In one embodiment, the ECU 100 applies a time delay (5 seconds for example) prior to executing step 304. If the air pressure in the front left air spring 56 is outside of the acceptable range, then the ECU 100 proceeds to block F. The ECU 100 proceeds through block F from step 302 as described above except that for steps 312, 318, 328 it uses the air pressure of the front left air spring 56 and the pressure set point for the front air springs 56, for steps 314, 322, 324, 332 the active valve is the air spring valve 126, and from steps 322, 332 the ECU 100 proceeds to step 304.

Step 304 is performed by the ECU 100 in the same manner as step 298 described above. From step 304 directly or via block G, as the case may be, the ECU 100 proceeds to step 306.

At step 306, the ECU 100 determines if the pneumatic system is being operated in the manual or automatic mode. This is done in the same manner as described above with respect to step 206. If the pneumatic system is being operated in the manual mode, than the ECU 100 proceeds to step 310. If the pneumatic system is being operated in the automatic mode, then the ECU 100 proceeds to step 308.

At step 308, the ECU 100 determines if a pressure in the front right air spring 56 ($P_{F.Right}$), as sensed by the air pressure sensor 136, is within a predetermined acceptable range from the air pressure set point for the front air springs 56 corresponding to the selected air pressure setting. If the air pressure in the front right air spring 56 is within the acceptable range, then the ECU 100 proceeds to step 310. In one embodiment, the ECU 100 applies a time delay (5 seconds for example) prior to executing step 310. If the air pressure in the front right air spring 56 is outside of the acceptable range, then the ECU 100 proceeds to block F. The ECU 100 proceeds through block F from step 308 as described above except that for steps 312, 318, 328 it uses the air pressure of the front right air spring 56 and the pressure set point for the front air springs 56, for steps 314, 322, 324, 332 the active valve is the air spring valve 128, and from steps 322, 332 the ECU 100 proceeds to step 310.

Step 310 is performed by the ECU 100 in the same manner as step 298 described above. From step 304 directly or via block G, as the case may be, the ECU 100 returns to step 204.

Modifications and improvements to the above-described embodiments of the present invention may become apparent to those skilled in the art. For example, it is contemplated that the ECU 100 could be formed of multiple units having different functions. The foregoing description is intended to be exemplary rather than limiting. The scope of the present invention is therefore intended to be limited solely by the scope of the appended claims.

What is claimed is:

1. A vehicle comprising:
    a frame;
    two front wheels connected to the frame;
    two front suspension assemblies connecting the two front wheels to the frame;
    two rear wheels connected to the frame;
    two rear suspension assemblies connecting the two rear wheels to the frame,
    at least one of the two front and two rear suspension assemblies including an air spring;
    two seats connected to the frame, the two seats being disposed laterally beside each other;
    a steering device operatively connected to the two front wheels;
    an engine connected to the frame and operatively connected to at least one of the wheels;
    an air compressor connected to the frame, the air compressor being disposed under one of the two seats;
    an air inlet fluidly communicating with the air compressor for supplying air to the air compressor, the air inlet being disposed higher than the wheels;
    at least one air spring valve selectively fluidly communicating the air compressor with the at least one air spring for supplying air to the at least one air spring;
    an auxiliary air output supported by the frame;
    an auxiliary valve selectively fluidly communicating the auxiliary air output with the air compressor for selectively supplying air from the air compressor to a device other than the at least one air spring;
    a control unit electrically connected to the air compressor for controlling an operation of the air compressor and electrically connected to the at least one air spring valve and the auxiliary valve for controlling positions of the valves; and
    a vehicle condition sensor electrically connected to the control unit, the vehicle condition sensor sensing an operating condition of the vehicle, the control unit only opening the auxiliary valve to fluidly communicate the auxiliary air output with the air compressor when a predetermined operating condition of the vehicle is sensed by the vehicle condition sensor.

2. The vehicle of claim 1, wherein the vehicle condition sensor is a vehicle speed sensor sensing a speed of the vehicle; and
    wherein the predetermined operating condition of the vehicle is the speed of the vehicle being one of less than or equal to a predetermined vehicle speed.

3. The vehicle of claim 2, wherein the predetermined operating condition of the vehicle is the speed of the vehicle being equal to 0 km/h.

4. The vehicle of claim 1, wherein the vehicle condition sensor is a parking brake sensor sensing a position of a parking brake of the vehicle; and
    wherein the predetermined operating condition of the vehicle is the parking brake being engaged.

5. The vehicle of claim 1, wherein the vehicle condition sensor is a shifter position sensor sensing a position of a shifter of the vehicle; and
    wherein the predetermined operating condition of the vehicle is the shifter being in one of a neutral shift position and a park shift position.

6. The vehicle of claim 1, further comprising:
    an air passage fluidly communicating the air compressor with the at least one air spring valve and the auxiliary valve;
    an auxiliary air output hose fluidly communicating the auxiliary valve with the auxiliary air output; and
    a pressure sensor fluidly communicating with the air passage for sensing an air pressure inside the air passage, the pressure sensor being electrically connected to the control unit for sending a signal representative of the air pressure inside the air passage to the control unit;
    wherein the control unit opens the at least one air spring valve to fluidly communicate the at least one air spring with the air passage such that the pressure sensor senses an air pressure in the at least one air spring;

wherein the control unit maintains the at least one air spring valve opened and sends a signal to the air compressor to supply air when the air pressure in the at least one air spring sensed by the air pressure sensor is less than a first predetermined air pressure;

wherein when the predetermined operating condition of the vehicle is sensed by the vehicle condition sensor, the control unit opens the auxiliary valve to fluidly communicate the auxiliary air output hose with the air passage such that the pressure sensor senses an air pressure in the auxiliary air output hose; and wherein the control unit maintains the auxiliary valve opened and sends a signal to the air compressor to supply air when the air pressure in the auxiliary air output line sensed by the air pressure sensor is less than a second predetermined air pressure; and wherein the control unit only opens one of the at least one air spring valve and the auxiliary valve at a time.

7. The vehicle of claim 6, further comprising an exhaust valve selectively fluidly communicating the air passage with an atmosphere, the control unit being electrically connected to the exhaust valve for controlling positions of the exhaust valve;

wherein the control unit maintains the first valve opened and opens the exhaust valve when the air pressure in the air spring sensed by the air pressure sensor is greater than the first predetermined air pressure.

8. The vehicle of claims 6, wherein:

the at least one air spring is a first air spring, a second air spring, a third air spring, and a fourth air spring;

the first air spring is included in one of the two front suspension assemblies;

the second air spring is included in another one of the two front suspension assemblies;

the third air spring is included in one of the two rear suspension assemblies; and the fourth air spring is included in another one of the two rear suspension assemblies.

9. The vehicle of claim 8, wherein:

the at least one air spring valve is a first air spring valve, a second air spring valve, and at least one third air spring valve;

the first air spring valve selectively fluidly communicates the air passage with the first air spring;

the second air spring valve selectively fluidly communicates the air passage with the second air spring; and the at least one third air spring valve selectively fluidly communicates the air passage with the third and fourth air springs.

10. The vehicle of claim 9, wherein:

when the predetermined operating condition of the vehicle is not sensed by the vehicle condition sensor, the control unit successively opens the first air spring valve, the second air spring valve and the at least one third air spring; and when the predetermined operating condition of the vehicle is sensed by the vehicle condition sensor, the control unit successively opens the first air spring valve, the auxiliary valve, the second air spring valve, the auxiliary valve, the at least one third air spring, and the auxiliary valve;

the control unit only opens one of the first, second and at least one third air spring valves and the auxiliary valve at a time.

11. The vehicle of claim 1, further comprising at least one accumulator chamber fluidly communicating the at least one air spring valve with the at least one air spring.

12. The vehicle of claim 1, further comprising an air box fluidly connected to the engine for supplying air to the engine; and wherein the air inlet is an inlet of the air box.

13. The vehicle of claim 12, wherein the air box is disposed higher than the wheels.

14. The vehicle of claim 12, further comprising an air filter disposed in the air box; and wherein air flows through the air filter prior to flowing to the air compressor.

15. The vehicle of claim 1, wherein the auxiliary air output is a quick-connect connector, the quick-connect connector being disposed rearwardly of the seat.

16. A method of controlling a pneumatic system of a vehicle, the pneumatic system including an air compressor, at least one air spring associated with at least one suspension assembly of the vehicle, and an auxiliary output for supplying air from the air compressor to a device other than the at least one air spring, the method comprising:

determining if the vehicle is stationary or in motion;

sensing an air pressure in the at least one air spring;

supplying air from the air compressor to the at least one air spring when the air pressure in the at least one air spring is less than a first predetermined pressure regardless of whether the vehicle is stationary or in motion; and only when the vehicle is determined to be stationary:

sensing an air pressure in an auxiliary air output hose fluidly communicating with the auxiliary air output; and supplying air from the air compressor to the auxiliary air output hose when the air pressure in the auxiliary air output hose is less than a second predetermined pressure.

17. The method of claim 16, wherein determining if the vehicle is stationary includes sensing a speed of the vehicle.

18. The method of claim 16, wherein determining if the vehicle is stationary includes determining if a parking brake of the vehicle is engaged.

19. The method of claim 16, wherein determining if the vehicle is stationary includes determining if a shifter of the vehicle is in one of a neutral shift position and a park shift position.

20. The method of claim 16, further comprising fluidly communicating the at least one air spring with an atmosphere when the air pressure in the at least one air spring is greater than a first predetermined pressure.

21. The method of claim 16, further comprising using a common air pressure sensor to sense the air pressure in the at least one air spring and the air pressure in the auxiliary air output hose.

22. The method of claim 21, wherein the pneumatic system also includes at least one air spring valve selectively fluidly communicating the at least one air spring with the air compressor, an auxiliary valve selectively fluidly communicating the auxiliary air output hose with the air compressor, and an air passage fluidly communicating the air compressor with the at least one air spring valve and the auxiliary valve;

wherein using the common air pressure sensor includes sensing air pressure in the air passage;

the method further comprising:

opening the at least one air spring valve to sense the air pressure in the at least one air spring; and opening the at least one auxiliary valve to sense the air pressure in the auxiliary air output hose; and wherein only one of the at least one air spring valve and the auxiliary valve is opened at a time.

23. The method of claim 22, wherein the at least one air spring is a first air spring, a second air spring, a third air spring, and a fourth air spring, and the at least one air spring valve is a first air spring valve, a second air spring valve, and at least one third air spring valve, wherein:

opening the at least one air spring valve includes:

opening the first air spring valve to fluidly communicate the air passage with the first air spring;

opening the second air spring valve to fluidly communicate the air passage with the second air spring; and opening the at least one third air spring valve to fluidly communicate the air passage with the third and fourth air springs.

24. The method of claim 23, further comprising:

successively opening the first air spring valve, the second air spring valve and the at least one third air spring when the vehicle is determined to be in movement; and successively opening the first air spring valve, the auxiliary valve, the second air spring valve, the auxiliary valve, the at least one third air spring, and the auxiliary valve when the vehicle is determined to be stationary;

wherein only one of the first, second and at least one third air spring valves and the auxiliary valve is opened at a time.

25. The method of claim 16, wherein supplying air from the air compressor to the at least one air spring when the air pressure in the at least one air spring is less than the first predetermined pressure includes:

when the vehicle is determined to be in movement:

estimating an amount of time during which the air compressor needs to supply air to increase the air pressure in the at least one air spring to the first predetermined pressure; and supplying air from the air compressor for the amount of time; and when the vehicle is determined to be stationary:

supplying air from the air compressor until the sensed air pressure in the at least one air spring corresponds to the first predetermined pressure.

26. The method of claim 16, wherein supplying air from the air compressor to the at least one air spring includes supplying air from the air compressor to the at least one air spring via at least one accumulator chamber.

* * * * *